US 12,410,085 B2

(12) United States Patent
Noma et al.

(10) Patent No.: US 12,410,085 B2
(45) Date of Patent: Sep. 9, 2025

(54) WASTE TREATMENT SYSTEM AND WASTE TREATMENT METHOD

(71) Applicant: MITSUBISHI HEAVY INDUSTRIES, LTD., Tokyo (JP)

(72) Inventors: Akira Noma, Tokyo (JP); Kazuhiro Kawai, Tokyo (JP); Keiji Fujikawa, Tokyo (JP); Susumu Okino, Tokyo (JP); Shinichi Okamoto, Tokyo (JP); Shinji Nakamura, Tokyo (JP); Kouetsu Shizukuishi, Tokyo (JP); Nobuyuki Ukai, Tokyo (JP); Yuuji Nakajima, Tokyo (JP); Keiichi Nakagawa, Tokyo (JP); Haruka Adachi, Tokyo (JP); Takashi Ike, Tokyo (JP); Yosuke Nakagawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 419 days.

(21) Appl. No.: 18/027,486

(22) PCT Filed: Sep. 21, 2021

(86) PCT No.: PCT/JP2021/034554
§ 371 (c)(1),
(2) Date: Mar. 21, 2023

(87) PCT Pub. No.: WO2022/065294
PCT Pub. Date: Mar. 31, 2022

(65) Prior Publication Data
US 2023/0406746 A1   Dec. 21, 2023

(30) Foreign Application Priority Data

Sep. 28, 2020  (JP) ................. 2020-162501

(51) Int. Cl.
*C02F 11/04* (2006.01)
*B09B 3/45* (2022.01)
(Continued)

(52) U.S. Cl.
CPC ............... *C02F 11/04* (2013.01); *B09B 3/65* (2022.01); *C02F 3/006* (2013.01); *C02F 11/18* (2013.01);
(Continued)

(58) Field of Classification Search
CPC .......... C02F 11/04; C02F 3/006; C02F 11/18; C02F 2209/001; C02F 2209/003;
(Continued)

(56) References Cited

U.S. PATENT DOCUMENTS

2021/0146410 A1    5/2021   Yukumoto et al.
2022/0162136 A1*   5/2022   Yukumoto ............ C05F 17/993

FOREIGN PATENT DOCUMENTS

JP    S60078699 A    5/1985
JP    H03229129 A   10/1991
(Continued)

OTHER PUBLICATIONS

Machine-generated English translation of JP 2005254165, generated on Jul. 8, 2025.*
(Continued)

*Primary Examiner* — Fred Prince
(74) *Attorney, Agent, or Firm* — Osha Bergman Watanabe & Burton LLP

(57) ABSTRACT

A waste treatment system, includes: at least one reformer for hydrolyzing waste; a microbial reactor for microbially degrading a reformed material containing at least a solid of the waste hydrolyzed by the at least one reformer; a microbial reaction detection device for detecting a state of degradation of the reformed material in the microbial reactor;
(Continued)

and an adjustment device for adjusting amount and timing of supply of the reformed material to the microbial reactor, based on a detected value of the microbial reaction detection device.

16 Claims, 12 Drawing Sheets

(51) Int. Cl.
  *B09B 3/65* (2022.01)
  *C02F 3/00* (2023.01)
  *C02F 11/18* (2006.01)

(52) U.S. Cl.
  CPC ............ *B09B 3/45* (2022.01); *C02F 2209/001* (2013.01); *C02F 2209/003* (2013.01); *C02F 2209/006* (2013.01); *C02F 2209/11* (2013.01); *C02F 2209/12* (2013.01); *C02F 2209/14* (2013.01); *C02F 2303/10* (2013.01); *Y02E 50/30* (2013.01)

(58) Field of Classification Search
  CPC ............ C02F 2209/006; C02F 2209/11; C02F 2209/12; C02F 2209/14; C02F 2303/10; B09B 3/65; B09B 3/45; Y02E 50/30
  USPC ......................................... 210/614, 252, 259
  See application file for complete search history.

(56) References Cited

FOREIGN PATENT DOCUMENTS

| | | | |
|---|---|---|---|
| JP | 2001321792 | A | 11/2001 |
| JP | 2003285031 | A | 10/2003 |
| JP | 2004082017 | A | 3/2004 |
| JP | 2005254165 | A * | 9/2005 |
| JP | 2006239623 | A | 9/2006 |
| JP | 2006239625 | A | 9/2006 |
| JP | 2008246359 | A | 10/2008 |
| JP | 4864339 | B2 | 2/2012 |
| JP | 2012110833 | A | 6/2012 |
| JP | 2013204031 | A | 10/2013 |
| JP | 2018144001 | A | 9/2018 |
| JP | 2018167165 | A | 11/2018 |
| JP | 6640268 | B2 | 2/2020 |
| JP | 2020520248 | A | 7/2020 |
| JP | 2020163280 | A | 10/2020 |
| WO | 2018189525 | A1 | 10/2018 |

OTHER PUBLICATIONS

Office Action Issued in Corresponding JP Application No. 2020-162501, dated Oct. 1, 2024 (13 Pages with English Translation).
International Search Report of PCT/JP2021/034554 dated Dec. 7, 2021 (13 pages).
International Preliminary Report on Patentability mailed on Apr. 6, 2023 in corresponding International (PCT) Application No. PCT/JP2021/034554 (19 pages with English Translation).

\* cited by examiner

WASTE TREATMENT SYSTEM AND WASTE TREATMENT METHOD

TECHNICAL FIELD

The present disclosure relates to a waste treatment system and a waste treatment method.

The present application claims priority based on Japanese Patent Application No. 2020-162501 filed on Sep. 28, 2020, the entire content of which is incorporated herein by reference.

BACKGROUND ART

Patent Document 1 describes a treatment device for organic waste including organic wastewater or solid waste, for example, excess sludge from a sewage treatment plant, food waste such as kitchen waste, or livestock waste. In the treatment device, organic waste is decomposed into soluble organic matter with low molecular weight and then separated into solid and liquid phases, and the separated liquid is degraded (methane fermentation) by microorganisms in a microbial reactor (methane fermenter) to produce biogas.

CITATION LIST

Patent Literature

Patent Document 1: JP4864339B

SUMMARY

Problems to be Solved

A microbial reactor may quickly become unsuitable for microbial degradation, for example, if the properties of feed (object to be degraded) supplied to the microbial reactor are heterogeneous, or if the supply amount of feed is insufficient. Further, since microorganisms are sensitive to environmental changes, once the state of the microbial reactor becomes unsuitable, it takes a lot of time and cost to recover. Therefore, it is desirable to maintain the microbial reactor in a state suitable for microbial degradation.

The present disclosure was made in view of the above problem, and an object thereof is to provide a waste treatment system and a waste treatment method whereby it is possible to maintain the microbial reactor in a state suitable for microbial degradation.

Solution to the Problems

In order to achieve the above object, a waste treatment system according to the present disclosure includes: at least one reformer for hydrolyzing waste; a microbial reactor for microbially degrading a reformed material containing at least a solid of the waste hydrolyzed by the at least one reformer; a microbial reaction detection device for detecting a state of degradation of the reformed material in the microbial reactor; and an adjustment device for adjusting amount and timing of supply of the reformed material to the microbial reactor, based on a detected value of the microbial reaction detection device.

In order to achieve the above object, a waste treatment method according to the present disclosure includes: a step of hydrolyzing waste; a step of microbially degrading a reformed material containing at least a solid of the hydrolyzed waste; a step of detecting a state of degradation of the reformed material; and a step of adjusting amount of the reformed material in the step of microbially degrading the reformed material, based on the detected state of degradation of the reformed material.

Advantageous Effects

With the waste treatment system and the waste treatment method of the present disclosure, since the amount and timing of supply of the reformed material to the microbial reactor are adjusted based on the state of degradation of the reformed material in the microbial reactor, the microbial reactor can be maintained in a state suitable for microbial degradation.

DETAILED DESCRIPTION

Hereinafter, a waste treatment system and a waste treatment method according to embodiments of the present disclosure will be described with reference to the drawings. The embodiments each indicate one aspect of the present disclosure, do not intend to limit the disclosure, and can optionally be modified within a scope of a technical idea of the present disclosure.

First Embodiment

<Configuration of Detection System According to First Embodiment>

Figure 1:
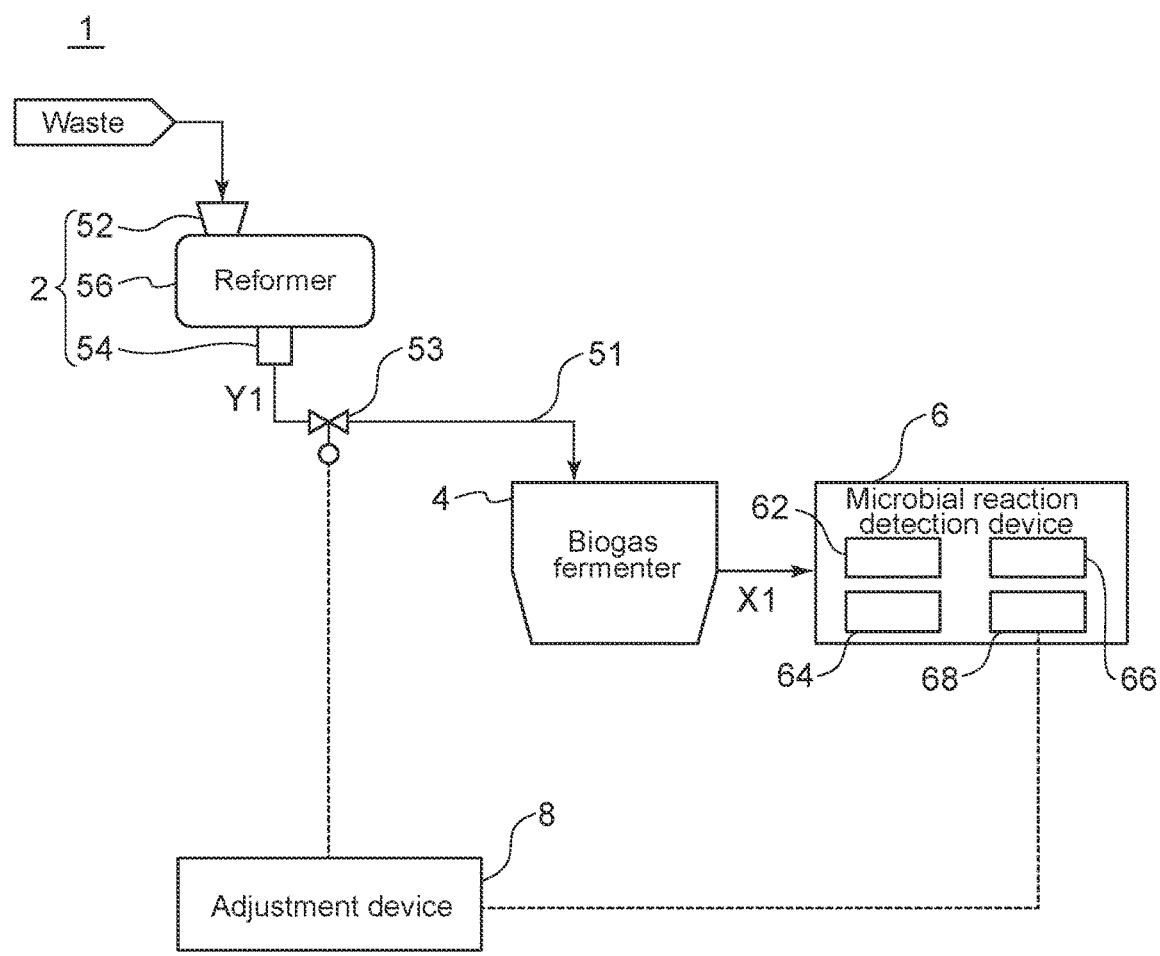
FIG. 1 is a schematic configuration diagram of the waste treatment system according to the first embodiment of the present disclosure.

FIG. 1 is a schematic configuration diagram of the waste treatment system 1 according to the first embodiment of the present disclosure. As shown in FIG. 1, the waste treatment system 1 includes a reformer 2, a microbial reactor (biogas fermenter 4), a microbial reaction detection device 6, and an adjustment device 8.

The reformer 2 hydrolyzes waste. The reformer 2 is configured to receive waste as it is from a vehicle, a plant, or the like where the waste is collected, and hydrolyze the waste with steam in a batch manner, for example. Specifically, the reformer 2 is a batch-type reformer including a housing 56 with an input port 52 through which the waste is input and a discharge port 54 through which the hydrolyzed waste is discharged. The input port 52 and the discharge port 54 are provided with opening/closing valves (not shown), and the housing 56 can be sealed by closing the opening/closing valves. The hydrolysis of the waste in the reformer 2 may be wet hydrolysis in which steam contacts the waste and heats the waste, or may be dry hydrolysis in which steam indirectly heats the waste without contacting the waste. In the case of dry hydrolysis, moisture in the waste within the housing 56 evaporates into water vapor, and the water vapor uniformly heats the waste within the housing 56. Further, moisture required for hydrolysis is supplied as moisture from the water vapor adheres to the surface of the waste. Although one reformer 2 is shown in FIG. 1, a plurality of reformers 2 may be connected in series, or a plurality of reformers 2 may be connected in parallel, or the configuration where a plurality of reformers 2 are connected in series and the configuration where a plurality of reformers 2 are connected in parallel may be combined.

The microbial reactor microbially degrades a reformed material Y1 containing at least a solid of the waste hydrolyzed by the reformer 2. Such a microbial reactor may be for example, but not particularly limited to, a biogas fermenter in which the hydrolyzed waste is microbially degraded to produce biogas such as methane as valuables. In the present disclosure, the case where the microbial reactor is a biogas fermenter 4 will be described as an example. However, the microbial reactor is not limited to the biogas fermenter 4. For example, the microbial reactor may be a saccharification tank for producing sugar as valuables from carbohydrates such as starch and cellulose, or a composting device for producing compost by composting.

In the embodiment illustrated in FIG. 1, the biogas fermenter 4 is connected to the reformer 2 via a reforming line 51 through which the reformed material Y1 flows. The reforming line 51 is provided with a regulating valve 53 for adjusting the amount and timing of supply of the reformed material Y1 to the biogas fermenter 4. The opening degree of the regulating valve 53 is adjusted according to instructions transmitted from the adjustment device 8 as will be described later.

Here, advantages of the waste treatment system 1 including the reformer 2 and the biogas fermenter 4 will be described.

Kitchen waste in the waste mainly contains proteins, carbohydrates, fats. By hydrolyzing the kitchen waste, pin-holes are formed in cell membranes and cell walls, or cell membranes and cell walls are dissolved, resulting in outflow of cell fluids. Consequently, the kitchen waste is broken down, and polymers are converted to smaller molecules. Moreover, volatile fatty acids (VFA) such as acetic acid increase.

Hydrophobic lignin and hemicellulose constituting plants such as woods in the waste are converted to hydrophilic substances and dissolved by hydrolysis, thereby exposing cellulose. Paper waste in the waste becomes hydrophilic due to dissolution of chemical on the surface. Further, the contents of the biogas fermenter 4 are stirred with an agitator (agitator 44, which will be described below) and thus finely pulverized, softened, and decreased in diameter. Plastic waste in the waste is heated and softened, sheared by stirring with an agitator, and decreased in diameter.

The reformed material, which is the waste hydrolyzed in the reformer 2, includes various components generated from the kitchen waste, paper waste (including wood, etc.), and plastic waste as described above, and a small amount of metal hardly affected by hydrolysis. Since the waste having the above-described composition has relatively low moisture content, the reformed material is mostly composed of solid, with very little liquid. Such a reformed material is discharged from the housing 56 through the discharge port 54 and transferred to the biogas fermenter 4. If the waste has high moisture content, such as sludge, the amount of liquid in the reformed material is large, resulting in a slurry reformed material. Even in such a case, the reformed material is entirely transferred to the biogas fermenter 4 without solid-liquid separation. In the biogas fermenter 4, the reformed material is degraded by biological action of microorganisms to produce valuables.

The kitchen waste in the waste is broken down by hydrolysis to increase the surface area of kitchen waste-derived components. This increases the area subjected to the biological action of microorganisms, which in turn promotes the degradation. When uneven distribution of the kitchen waste-derived components is reduced and homogenized by breaking down the kitchen waste, the activity of the biological action is homogenized, and the degradation is stabilized. In addition, the increase in volatile fatty acids promotes the degradation. Further, the degradation of kitchen waste-derived components suppresses the foaming of fat in the biogas fermenter 4. The foaming causes a trouble of clogging of an overflow port (not shown) of the biogas fermenter 4, but it is possible to suppress the occurrence of such a trouble.

When cellulose of the paper waste or plant in the waste is exposed by hydrolysis, microorganisms can easily access the cellulose, which promotes the degradation. Further, when these components become hydrophilic and are decreased in diameter, they do not float in the biogas fermenter 4, reducing the risk of inhibiting the degradation. The plastic waste in the waste is also decreased in diameter by hydrolysis, reducing the risk of inhibiting the degradation.

Thus, since valuables can be produced by degrading the reformed material, which is obtained by hydrolyzing the waste by the reformer 2, in the biogas fermenter 4 without solid-liquid separation, it is possible to produce valuables even from the waste with low moisture content. Further, since the waste treatment system 1 does not require a device for solid-liquid separation of the reformed material Y1 and produces only valuables with a high unit price, such as biogas, it is possible to treat the waste at low cost, compared to a system in which solid-liquid separation is performed on the reformed material, and biogas is produced from the liquid separated, while fuel, fertilizer, etc., are produced from the solid separated.

The advantages of the waste treatment system 1 including the reformer 2 and the biogas fermenter 4 have been described. However, since the reformer 2 has the effect of amplifying the influence of the raw material (waste) composition, in the configuration with only the reformer 2 and the biogas fermenter 4, small fluctuations in the inlet composition are amplified when the reforming operation fails, and it is often difficult to stably operate the biogas fermenter 4. Therefore, in order to maintain the biogas fermenter 4 in a state suitable for microbial degradation, the waste treatment system 1 according to the present disclosure includes, in addition to the reformer 2 and the biogas fermenter 4, a microbial reaction detection device 6 and an adjustment device 8.

The microbial reaction detection device 6 detects the state of degradation of the reformed material Y1 in the biogas fermenter 4 (hereinafter referred to as "the state of the biogas fermenter 4"). In the embodiment illustrated in FIG. 1, the microbial reaction detection device 6 includes a collecting device 62 for collecting part of the reformed material Y1 in the biogas fermenter 4 as a detection sample X1, a solid-liquid separation device 64 for separating the detection sample X1 into a solid component and a liquid component, a dilution device 66 for diluting the liquid component separated by the solid-liquid separation device 64, and a concentration measurement device 68 for measuring the concentration of a diluted liquid which is the liquid component diluted by the dilution device 66.

The concentration of the diluted liquid measured by the concentration measurement device 68 is the concentration for evaluating the state of the biogas fermenter 4, and includes, for example, at least one of the concentration of volatile fatty acids (VFA) or the concentration of ammonia. In another embodiment, the concentration of the diluted liquid measured by the concentration measurement device 68 includes at least one of the concentration of an inhibitor such as volatile fatty acids, ammonia, sodium, phenol, fural, and melanoidin, the concentration of chlorides such as sodium chloride and potassium chloride, or pH (hydrogen ion concentration). The inhibitor is a substance that inhibits the microbial degradation of the reformed material Y1 when the concentration exceeds a predetermined value. For example, volatile fatty acids above 10,000 ppm, ammonia above 2,000 ppm, sodium above 2,000 ppm, phenol above 1,000 ppm, fural above 1,000 ppm, and melanoidin above 1,000 ppm inhibit the microbial degradation of the reformed material Y1.

The adjustment device 8 adjusts the amount and timing of supply of the reformed material Y1 to the biogas fermenter 4, based on a detected value of the microbial reaction detection device 6. In the embodiment illustrated in FIG. 1, the adjustment device 8 is a computer such as an electronic control unit, and includes a processor such as CPU or GPU, a memory such as ROM or RAM, and an I/O interface (not shown). The adjustment device 8 is electrically connected to the concentration measurement device 68 and the regulating valve 53. The adjustment device 8 acquires a measured value of the concentration measurement device 68, and calculates the opening degree of the regulating valve 53 by operating the processor (e.g., computation) in accordance with an instruction of a program loaded to the memory, based on the measured value of the concentration measurement device 68. Further, the adjustment device 8 instructs the regulating valve 53 to set the calculated opening degree, and adjusts the amount and timing of supply of the reformed material to the biogas fermenter 4. The adjustment device 8 may be installed in the plant together with the reformer 2 and the biogas fermenter 4, or may be installed in a place different from the plant. Further, the adjustment device 8 may be configured on a cloud server.

<Effect of Waste Treatment System According to First Embodiment>

According to the first embodiment, since the amount and timing of supply of the reformed material Y1 to the biogas fermenter 4 are adjusted based on the state of the biogas fermenter 4 detected by the microbial reaction detection device 6, the biogas fermenter 4 can be maintained in a state suitable for microbial degradation. Additionally, although the reformed material Y1 produced by the reformer 2 may fluctuate in composition, the amount and timing of supply of the reformed material Y1 to the biogas fermenter 4 are adjusted based on the state of the biogas fermenter 4 disposed downstream of the reformer 2. Thus, it is possible to suppress the influence of the composition fluctuation of the reformed material Y1 on the biogas fermenter 4.

In the first embodiment, the microbial reaction detection device 6 detects the state of the biogas fermenter 4 by measuring the concentration of the diluted liquid obtained by diluting the liquid component of the reformed material Y1 in the biogas fermenter 4 by the concentration measurement device 68, but the present disclosure is not limited to this embodiment. For example, the microbial reaction detection device 6 may include, in addition to the concentration measurement device 68, an electrical conductivity measurement device for measuring the electrical conductivity of the diluted liquid. In this case, the state of the biogas fermenter 4 is evaluated based on the concentration and electrical conductivity of the dilution liquid.

Second Embodiment

<Configuration of Detection System According to Second Embodiment>

The waste treatment system 1 according to the second embodiment will be described. The waste treatment system 1 according to the second embodiment differs from the waste treatment system 1 according to the first embodiment in that it further includes a reforming state detection device 10 and a hydrolysis condition adjustment device 12. In the second embodiment, the same constituent elements as those in the first embodiment are associated with the same reference numerals and not described again in detail.

Figure 2:
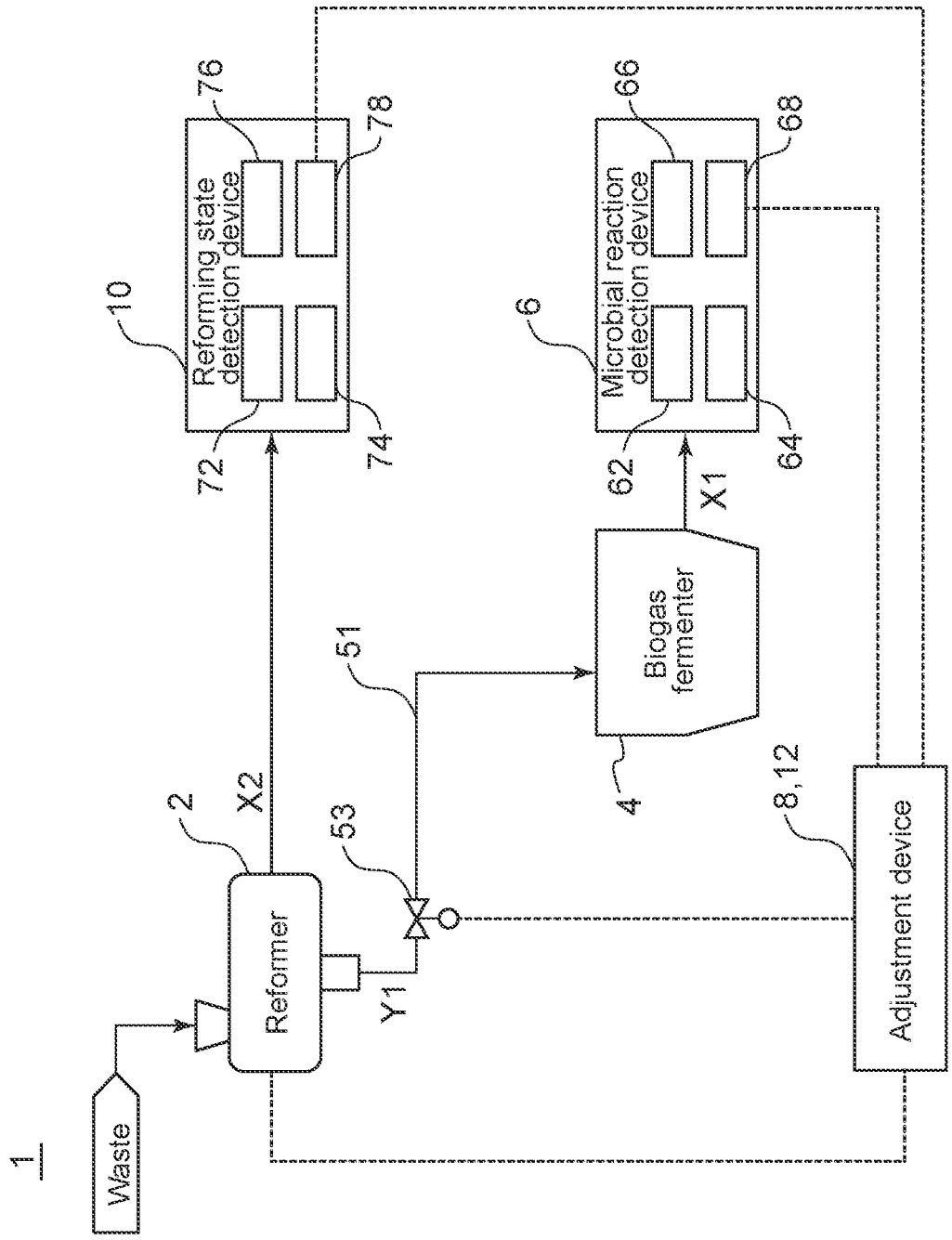
FIG. 2 is a schematic configuration diagram of the waste treatment system according to the second embodiment of the present disclosure.

FIG. 2 is a schematic configuration diagram of the waste treatment system 1 according to the second embodiment of the present disclosure. As shown in FIG. 2, the waste treatment system 1 further includes a reforming state detection device 10 and a hydrolysis condition adjustment device 12.

The reforming state detection device 10 detects the state of hydrolysis of waste in the reformer 2 (hereinafter referred to as "the state of the reformer 2"). In the embodiment illustrated in FIG. 2, the reforming state detection device 10 includes a collecting device 72 for collecting part of contents in the reformer 2 as a detection sample X2, a solid-liquid separation device 74 for separating the detection sample X2 into a solid component and a liquid component, a dilution device 76 for diluting the liquid component separated by the solid-liquid separation device 74, and a concentration measurement device 78 for measuring the concentration of a diluted liquid which is the liquid component diluted by the dilution device 76.

The concentration of the diluted liquid measured by the concentration measurement device 78 of the reforming state detection device 10 is the concentration for evaluating the state of the reformer 2, and includes, for example, at least one of the concentration of volatile fatty acids (VFA) or the concentration of ammonia. In an embodiment, the concentration of the diluted liquid measured by the concentration measurement device 78 includes at least one of the concentration of an inhibitor such as volatile fatty acids, ammonia, phenol, fural, and melanoidin, the concentration of chlorides such as sodium chloride and potassium chloride, or pH (hydrogen ion concentration).

The hydrolysis condition adjustment device 12 adjusts the hydrolysis condition (temperature/pressure/time/stirring speed, etc.) of the waste by the reformer 2, based on the state of the reformer 2 detected by the reforming state detection device 10. In the embodiment illustrated in FIG. 2, the adjustment device 8 functions as the hydrolysis condition adjustment device 12. Specifically, the adjustment device 8 is electrically connected to each of the reformer 2 and the concentration measurement device 78 of the reforming state detection device 10. The adjustment device 8 acquires a measured value of the concentration measurement device 78, and calculates the hydrolysis condition by operating the processor (e.g., computation) in accordance with an instruction of a program loaded to the memory, based on the measured value of the concentration measurement device 78. The adjustment device 8 then instructs the reformer 2 to operate under the calculated hydrolysis condition. In the embodiment illustrated in FIG. 2, the adjustment device 8 functions as the hydrolysis condition adjustment device 12, but in another embodiment, the adjustment device 8 and the hydrolysis condition adjustment device 12 may be separate from each other.

<Effect of Waste Treatment System According to Second Embodiment>

According to the second embodiment, since the waste treatment system 1 adjusts the hydrolysis condition of waste in the reformer 2 based on the state of the reformer 2, the reformed material Y1 suitable for microbial reaction can be supplied to the biogas fermenter 4 to efficiently produce valuables by microbial reaction.

The state of the reformer 2 may be determined based on the concentration of a liquid component of contents in the reformer 2. However, the contents may also contain a solid component. Therefore, when measuring the concentration of the liquid component of the contents in the reformer 2, it is necessary to remove the solid component. According to the second embodiment, the solid-liquid separation device 74 separates the detection sample X2 into a solid component and a liquid component. For solid-liquid separation, it is more effective to add an agent (aggregating agent, etc.) before the separation device. The dilution device 76 dilutes this liquid component. The concentration measurement device 78 measures the concentration of the diluted liquid, which is the diluted liquid component. Thus, according to the second embodiment, it is possible to improve the detection accuracy of the state of the reformer 2. When diluting the liquid component by the dilution device 76, an agent may be added to dilution water to improve coloration and increase the accuracy of measurement.

The hydrolysis condition in the reformer 2 may be adjusted based on the state of the biogas fermenter 4.

Although not shown, in some embodiments, the waste treatment system 1 is configured to set the hydrolysis condition (temperature/pressure/time/stirring speed, etc.) in the reformer 2, based on the state of the biogas fermenter 4 detected by the microbial reaction detection device 6.

Although not shown, in some embodiments, the concentration measurement device 68 of the microbial reaction detection device 6 detects the concentration of an inhibitor such as melanoidin, fural, and phenol in the detection sample X1 supplied from the biogas fermenter 4. Further, the waste treatment system 1 is configured to set the hydrolysis condition in the reformer 2, based on the state of the biogas fermenter 4 and the concentration of the inhibitor.

Third Embodiment

<Configuration of Detection System According to Third Embodiment>

The waste treatment system 1 according to the third embodiment will be described. The waste treatment system 1 according to the third embodiment differs from the waste treatment system 1 according to the first embodiment in that the adjustment device 8 is configured to adjust the supply amount and timing of a readily degradable material Y2 of the reformed material Y1 supplied to the biogas fermenter 4. In the third embodiment, the same constituent elements as those in the first embodiment are associated with the same reference numerals and not described again in detail. In another embodiment, the adjustment device 8 of the waste treatment system 1 according to the second embodiment may be configured to adjust the supply amount and timing of a readily degradable material Y2 supplied to the biogas fermenter 4.

Here, a readily degradable material Y2 and a persistent material Y3 will be described. The readily degradable material Y2 is a material that can be microbially degraded within a predetermined time, for example, a sugar such as glucose, among the reformed material Y1 supplied to the biogas fermenter 4. The persistent material Y3 is a material that takes a longer time to be microbially degraded in the biogas fermenter 4 than the readily degradable material Y2, for example, casein or cellulose. The predetermined time may be any time, such as 100 hours.

Figure 3:
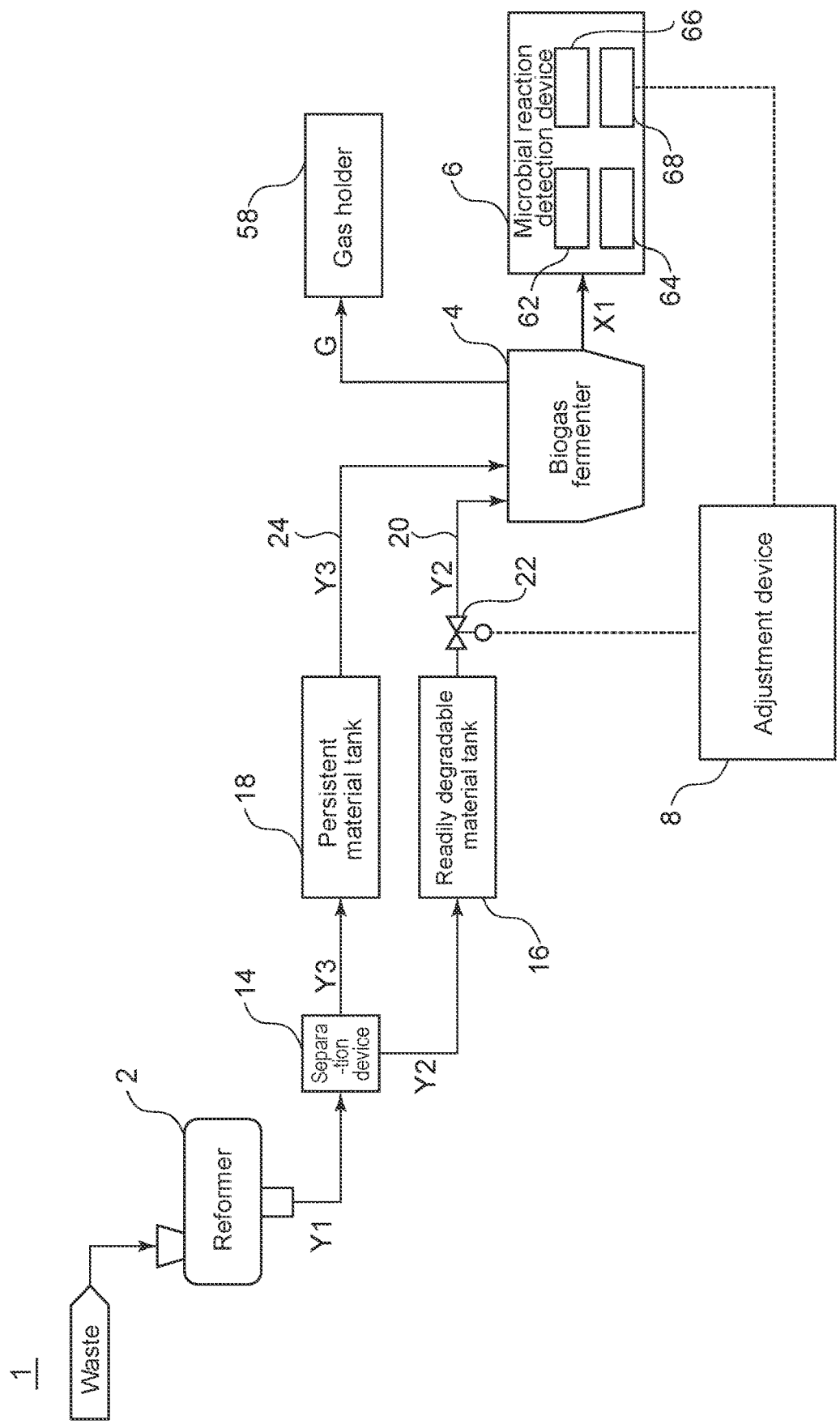
FIG. 3 is a schematic configuration diagram of the waste treatment system according to the third embodiment of the present disclosure.

FIG. 3 is a schematic configuration diagram of the waste treatment system 1 according to the third embodiment of the present disclosure. As shown in FIG. 3, the waste treatment system 1 further includes a separation device 14, a readily degradable material tank 16 for storing the readily degradable material Y2, and a persistent material tank 18 for storing the persistent material Y3. The readily degradable material tank 16 and the persistent material tank 18 are arranged in parallel to each other between the reformer 2 and the biogas fermenter 4.

The separation device 14 is disposed between the reformer 2 and the biogas fermenter 4. The separation device 14 separates a reaction-unsuitable substance that is unsuitable for microbial degradation in the biogas fermenter 4 from the reformed material Y1. In the embodiment illustrated in FIG. 3, the separation device 14 separates the reformed material Y1 supplied from the reformer 2 into the readily degradable material Y2 and the persistent material Y3. Such a separation device 14 may be, for example, a screen for separating the reformed material Y1 into a large particle size component and a small particle size component having a smaller particle size than the large particle size component.

The small particle size component separated by the separation device 14 is supplied to the readily degradable material tank 16 as the readily degradable material Y2. The readily degradable material tank 16 is connected to the biogas fermenter 4 via a readily degradable material line 20 through which the readily degradable material Y2 flows. The readily degradable material line 20 is provided with a readily degradable material regulating valve 22 for adjusting the amount of the readily degradable material Y2 supplied from the readily degradable material tank 16 to the biogas fermenter 4. The readily degradable material regulating valve 22 has the same configuration as the regulating valve 53, and the opening degree thereof is adjusted according to instructions transmitted from the adjustment device 8. That is, the adjustment device 8 adjusts the amount and timing of supply of the readily degradable material Y2 to the biogas fermenter 4, based on the state of the biogas fermenter 4 detected by the microbial reaction detection device 6. The readily degradable material Y2 (small particle size component) supplied to the biogas fermenter 4 is degraded to produce biogas G. Biogas G produced in the biogas fermenter 4 is stored in the gas holder 58.

The large particle size component separated by the separation device 14 is supplied to the persistent material tank 18 as the persistent material Y3. A principal component of the large particle size component is a component that has a relatively large particle size even after hydrolysis in the reformer 2, and cannot be degraded in the biogas fermenter 4, such as those derived from plastic waste or metal. To put it another way, the large particle size component and the small particle size component are a reaction-unsuitable substance and a reaction-suitable substance for microbial reaction, respectively. In the embodiment illustrated in FIG. 3, the persistent material tank 18 is connected to the biogas fermenter 4 via a persistent material line 24 through which the persistent material Y3 flows.

<Effect of Waste Treatment System According to Third Embodiment>

Whether the biogas fermenter 4 is suitable for microbial degradation often depends on the amount and timing of supply of the readily degradable material Y2 to the biogas fermenter 4. According to the third embodiment, since the adjustment device 8 adjusts the supply amount of the readily degradable material Y2 to the biogas fermenter 4 and the timing of supply of the readily degradable material Y2 to the biogas fermenter 4 based on the state of the biogas fermenter 4, the biogas fermenter 4 can be maintained in a state suitable for microbial degradation.

Further, according to the third embodiment, since the waste treatment system 1 includes the separation device 14, the persistent material Y3 is separated from the reformed material Y1, and the amount of the reaction-unsuitable substance supplied to the biogas fermenter 4 can be reduced. As a result, it is possible to reduce the risk of inhibiting the degradation in the biogas fermenter 4, and to efficiently perform the degradation. Further, compared to the case where the separation device 14 is not provided, the readily degradable material Y2 with high purity and fluidity can be supplied to the biogas fermenter 4. Thus, the biogas fermenter 4 can be quickly put in a state suitable for microbial degradation.

The embodiment illustrated in FIG. 3 describes an ideal embodiment in which the waste treatment system 1 includes the separation device 14, the readily degradable material tank 16, and the persistent material tank 18, and the readily degradable material Y2 and the persistent material Y3 are clearly separated and stored in the separate tanks, but they need not necessarily be completely separated. The waste treatment system 1 can achieve the same effects as described above by configuring the system so as to be able to adjust the supply amount of the readily degradable material Y2, which reacts particularly quickly.

Figure 4:
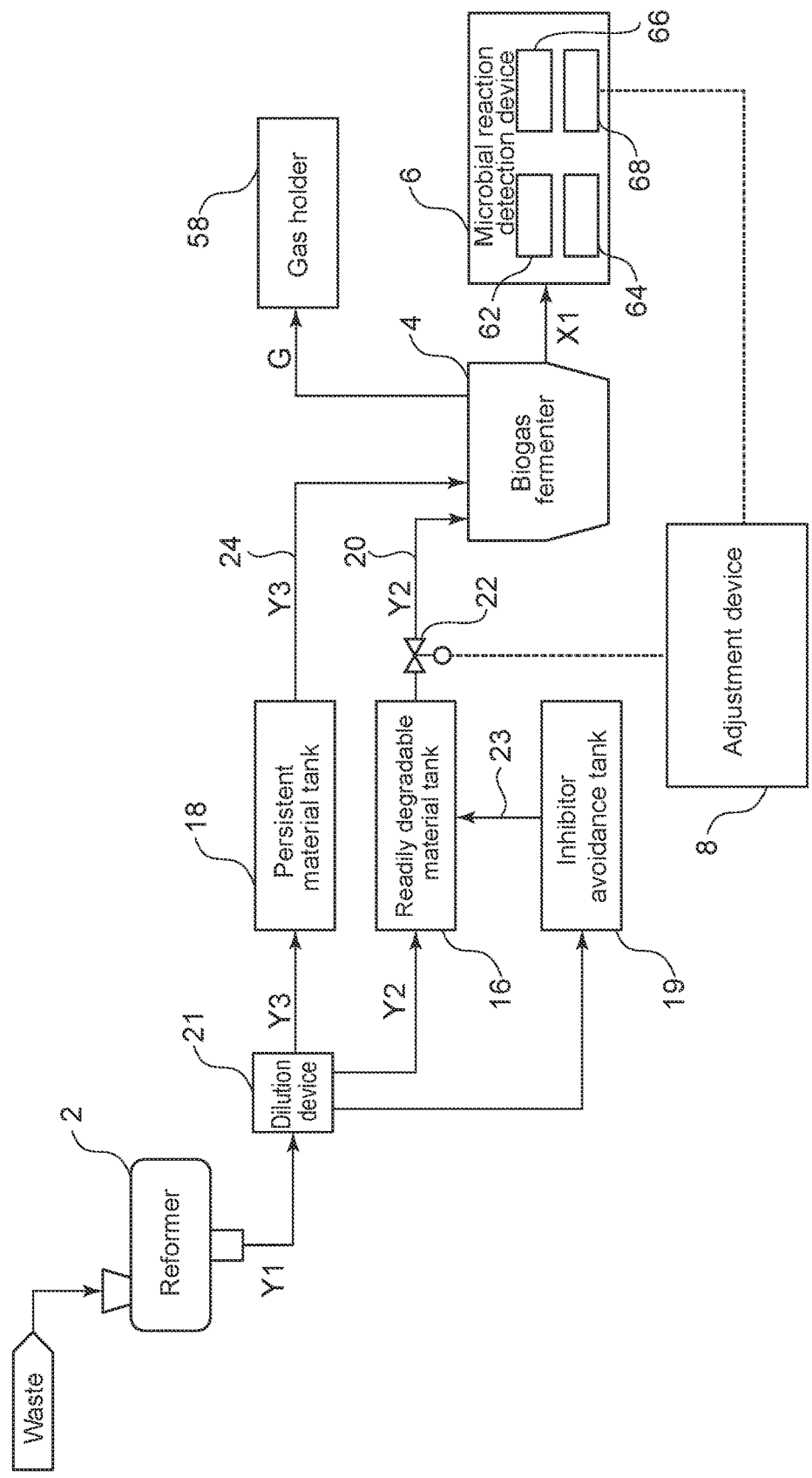
FIG. 4 is a schematic configuration diagram of the waste treatment system according to an embodiment of the present disclosure.

In the embodiment illustrated in FIG. 3, the waste treatment system 1 includes the readily degradable material tank 16 and the persistent material tank 18, but the present disclosure is not limited to this embodiment. In an embodiment, as shown in FIG. 4, the waste treatment system 1 includes, in addition to the readily degradable material tank 16 and the persistent material tank 18, an inhibitor avoidance tank 19. In the embodiment illustrated in FIG. 4, the system further includes a dilution device 21 for diluting the reformed material Y1 produced in the reformer 2. The solid component (persistent material Y3) of the reformed material Y1 diluted by the dilution device 21 is stored in the persistent material tank 18. The liquid component of the reformed material Y1 diluted by the dilution device 21 is stored in the readily degradable material tank 16 as the readily degradable material Y2 when the inhibitor concentration contained in the liquid component is equal to or lower than a preset concentration. In contrast, the liquid component of the reformed material Y1 diluted by the dilution device 21 is stored in the inhibitor avoidance tank 19 as an inhibitor when the inhibitor concentration contained in the liquid component is higher than the preset concentration. In an embodiment, when the inhibitor concentration contained in the liquid component exceeds a preset concentration, an adsorbent such as activated carbon is added from an additive feed device (not shown). The addition of the adsorbent may be done in the inhibitor avoidance tank 19 or in a line connecting the dilution device 21 and the inhibitor avoidance tank 19. With this configuration, the inhibitor adsorbed on the activated carbon is prevented from desorbing in the biogas fermenter 4, and the inhibitor adsorbed on the activated carbon can be discharged together with sludge without inhibiting the microbial reaction.

Further, in the embodiment illustrated in FIG. 4, the inhibitor avoidance tank 19 is connected to the readily degradable material tank 16 via a connection line 23 so that the liquid component stored in the inhibitor avoidance tank 19 can be supplied to the readily degradable material tank 16. With this configuration, it is possible to prevent the liquid component of the reformed material Y1 stored in the readily degradable material tank 16 from becoming insufficient.

Further, in an embodiment, although not shown, the waste treatment system 1 includes, instead of the readily degradable material tank 16 and the persistent material tank 18, a high-concentration inhibitor tank for storing the reformed material Y1 containing an inhibitor equal to or higher than a preset concentration and a low-concentration inhibitor tank for storing the reformed material Y1 containing an inhibitor lower than the preset concentration. In this case, the adjustment device 8 adjusts the supply amount and timing of supply of the reformed material Y1 stored in the low-concentration inhibitor tank to the biogas fermenter 4.

Fourth Embodiment

<Configuration of Detection System According to Fourth Embodiment>

The waste treatment system 1 according to the fourth embodiment will be described. The waste treatment system 1 according to the fourth embodiment differs from the waste treatment system 1 according to the third embodiment in that it further includes a readily degradable material state detection device 26 and a cellulase supply device 28. In the fourth embodiment, the same constituent elements as those in the third embodiment are associated with the same reference numerals and not described again in detail. In the waste treatment system 1 according to the third embodiment, the readily degradable material tank 16 is not an essential component, but in the waste treatment system 1 according to the fourth embodiment, the readily degradable material tank 16 is an essential component. In another embodiment, the waste treatment system 1 according to the second embodiment further includes a readily degradable material state detection device 26 and a cellulase supply device 28.

Figure 5:
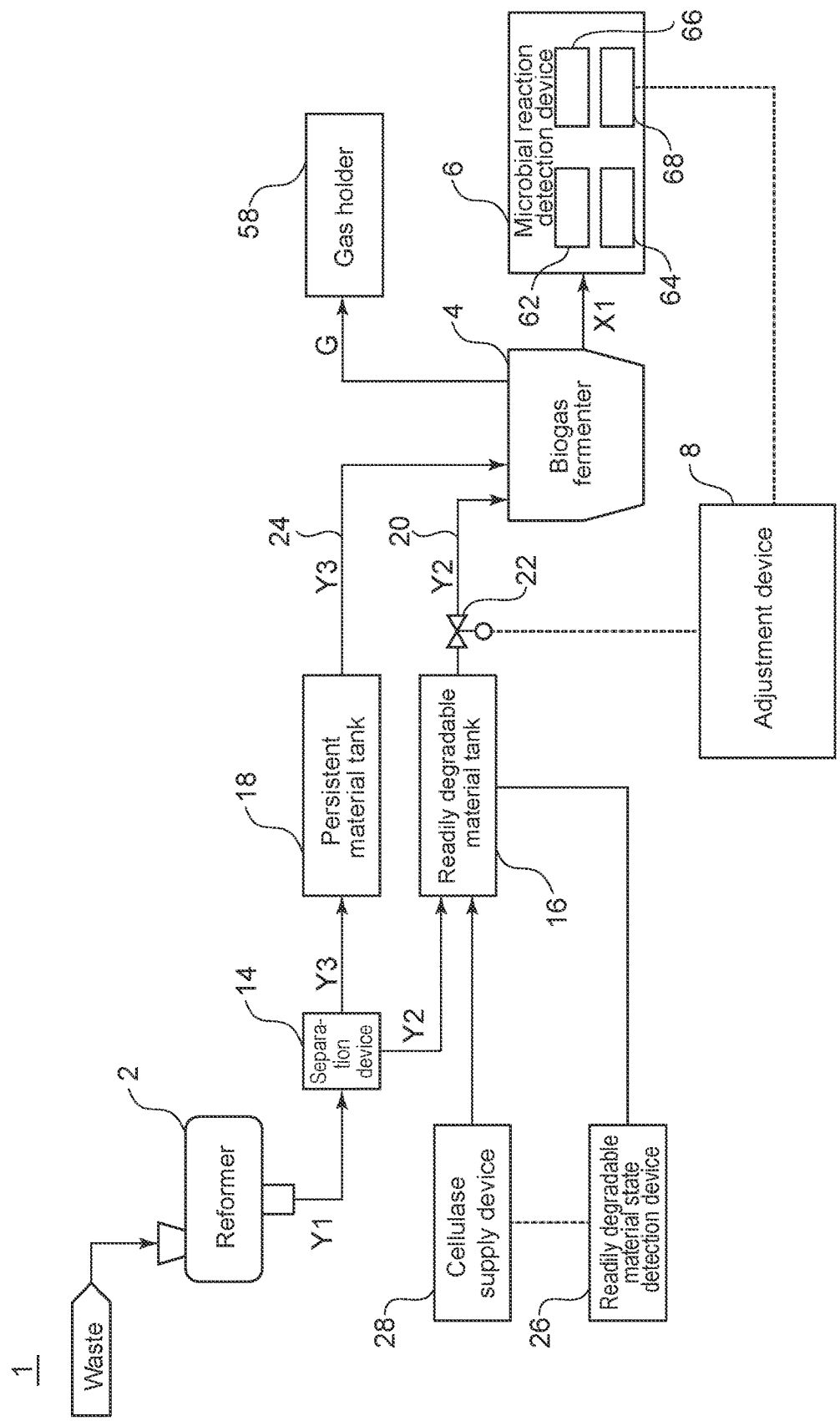
FIG. 5 is a schematic configuration diagram of the waste treatment system according to the fourth embodiment of the present disclosure.

FIG. 5 is a schematic configuration diagram of the waste treatment system 1 according to the fourth embodiment of the present disclosure. As shown in FIG. 5, the waste treatment system 1 further includes a readily degradable material state detection device 26 and a cellulase supply device 28.

The readily degradable material state detection device 26 detects the state of the readily degradable material Y2 in the readily degradable material tank 16 (hereinafter referred to as "the state of the readily degradable material tank 16"). The readily degradable material state detection device 26 includes a known turbidity measurement tool, such as a turbidimeter or a spectrophotometer, for measuring the turbidity of the readily degradable material Y2 in the readily degradable material tank 16.

The cellulase supply device 28 is electrically connected to the readily degradable material state detection device 26, and acquires the turbidity detected by the readily degradable material state detection device 26, and supplies cellulase to the readily degradable material tank 16, based on the turbidity. Specifically, when the turbidity exceeds a predetermined set value, the cellulase supply device 28 supplies cellulase to the readily degradable material tank 16.

<Effect of Detection System According to Fourth Embodiment>

According to the fourth embodiment, since the waste treatment system 1 includes the readily degradable material state detection device 26 for detecting the state of the readily degradable material tank 16, the state of the readily degradable material tank 16 can be grasped quickly.

The turbidity of the readily degradable material Y2 in the readily degradable material tank 16 depends on the content of cellulose in the readily degradable material Y2. Hydrolysis of waste containing more waste paper and plant may yield the readily degradable material Y2 containing more cellulose. According to the fourth embodiment, since cellulase is supplied to the readily degradable material tank 16 when the turbidity (cellulose) exceeds the set value, the microbial degradation of cellulose in the biogas fermenter 4 can be promoted.

In the fourth embodiment, the readily degradable material state detection device 26 detects the state of the readily degradable material tank 16 by measuring the turbidity of the readily degradable material Y2, but the present disclosure is not limited to this embodiment. In an embodiment, the readily degradable material state detection device 26 includes, instead of or in addition to the turbidity measurement device for measuring the turbidity, a sugar content measurement device for measuring the sugar content of the readily degradable material Y2 in the readily degradable material tank 16. Since the sugar content of the readily degradable material Y2 in the readily degradable material tank 16 depends on the content of cellulose in the readily degradable material Y2, the microbial degradation of cellulose in the biogas fermenter 4 can be promoted in the same way as the effect described above.

Figure 6:
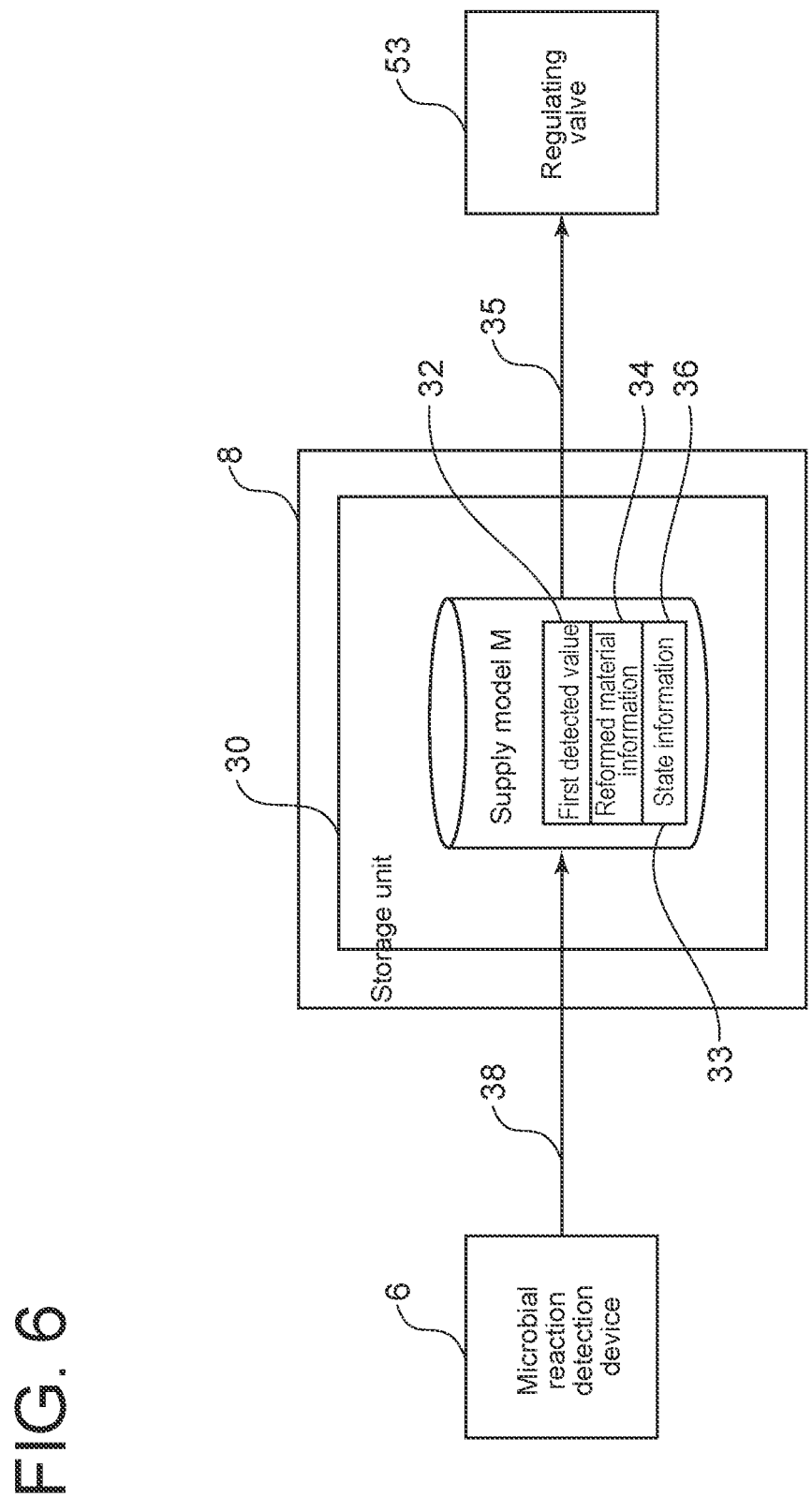
FIG. 6 is a schematic functional block diagram of the adjustment device according to an embodiment of the present disclosure.

FIG. 6 is a schematic functional block diagram of the adjustment device 8 according to an embodiment of the present disclosure. As shown in FIG. 6, the adjustment device 8 includes a storage unit 30. The storage unit 30 stores a supply model M created based on a first detected value 32 detected in the past by the microbial reaction detection device 6, reformed material information 34 including the amount and timing of supply of the reformed material Y1 to the biogas fermenter 4 based on the first detected value 32, and state information 36 including the state of the biogas fermenter 4 caused by supply of the reformed material Y1 based on the first detected value 32, external environmental information (e.g., season, weather, events, and other information affecting discharge of waste), and operating history information of the waste treatment system. In the embodiment illustrated in FIG. 6, the supply model M is created by machine-learning teacher data 33 in which the first detected value 32, the reformed material information 34, and the state information 36 are associated with each other. Further, the adjustment device 8 calculates the opening degree 35 of the regulating valve 53 by inputting a second detected value detected at present by the microbial reaction detection device 6 into the supply model M, and adjusts the amount and timing of supply of the reformed material Y1 to the biogas fermenter 4. Machine learning to create the supply model M may be performed with, but not limited to, random forests, for example.

With the configuration illustrated in FIG. 6, since the opening degree 35 of the regulating valve 53 is calculated by the supply model M created by machine learning or analysis of the teacher data 33, in which the first detected value 32, the reformed material information 34, and the state information 36 are associated with each other, the biogas fermenter 4 can be maintained in a state suitable for microbial degradation.

The first detected value 32 included in the teacher data 33 includes values detected by the microbial reaction detection device 6, such as the concentration of volatile fatty acids, but the teacher data 33 may include information detected by a device other than the microbial reaction detection device 6. In other words, the adjustment of the amount and timing of supply of the readily degradable material Y2 to the biogas fermenter 4 may take into account not only the state of the biogas fermenter 4 detected by the microbial reaction detection device 6, but also other information.

For example, the teacher data 33 may include the concentration of methane gas produced in the biogas fermenter 4, the torque of a motor 42 described below, and images of the reformed material Y1 taken by a near-infrared sensor such as a hyperspectral camera. With this configuration, since the supply model M is created taking into account the concentration of methane gas and other factors, the accuracy of the supply model M can be further improved. Especially in the case of reactors with microbial reactions, it is preferable to use multiple detectors because even a single detection error may impair microbial activity.

A specific example thereof will be described. In an embodiment, the supply model M is created based on reformer information including the torque for stirring contents of the reformer 2, tank information including the concentration of volatile fatty acids in contents of the readily degradable material tank 16, a first detected value 32, reformed material information 34, and state information 36. If the waste contains a large amount of readily degradable material Y2, such as raw garbage, the torque for stirring the contents of the reformer 2 is lower than usual, and the amount of the readily degradable material Y2 contained in the reformed material Y1 increases. In addition, the concentration of volatile fatty acids contained in the liquid component of the readily degradable material Y2 in the readily degradable material tank 16 increases, and the pH of this liquid component decreases. In addition, the torque for stirring the contents of the biogas fermenter 4 decreases, the concentration of volatile fatty acids contained in the liquid component of the readily degradable material Y2 in the biogas fermenter 4 increases, and the pH of this liquid component decreases. In this case, the amount of biogas produced in the biogas fermenter 4 tends to increase. The supply model M of the adjustment device 8 has machine-learned this tendency of biogas increase in advance. By inputting the state of the reformer 2 (value of agitation torque) as the reformer information, the state of the readily degradable material tank 16 (concentration of volatile fatty acids) as the tank information, or the state of the biogas fermenter 4 (concentration of volatile fatty acids) into the supply model M, the adjustment device 8 estimates an increase in the concentration of the readily degradable material Y2 in the biogas fermenter 4, and reduces the amount of the readily degradable material Y2 supplied to the biogas fermenter 4. The reformer information may include, in addition to or instead of the torque for stirring the contents of the reformer 2, the amount of the readily degradable material Y2 contained in the reformer 2. The tank information may include, in addition to or instead of the concentration of volatile fatty acids, at least one of the concentration of an inhibitor, the concentration of ammonia, or the pH of the liquid component of the readily degradable material Y2. The first detected value 32 may include, in addition to or instead of the concentration of volatile fatty acids contained in the contents of the biogas fermenter 4, the concentration of an inhibitor, the concentration of ammonia, the pH of the liquid component of the readily degradable material Y2, and the torque for stirring the contents of the biogas fermenter.

If the amount of proteins in the waste is low, the concentration of an inhibitor (e.g., melanoidin) in the liquid component of the reformed material Y1 immediately after being produced in the reformer 2 decreases, and the pH of this liquid component decreases. In addition, the concentration of an inhibitor contained in the liquid component of the readily degradable material Y2 in the readily degradable material tank 16 decreases, and the pH of this liquid component decreases. In addition, the concentration of an inhibitor and the concentration of ammonia contained in the liquid component of the readily degradable material Y2 in the biogas fermenter 4 decreases, and the pH of this liquid component decreases. In addition, the alkalinity in the biogas fermenter 4 decreases. In this case, nitrogen components in the readily degradable material Y2 in the biogas fermenter 4 tend to be insufficient. The supply model M of the adjustment device 8 is created based on the reformer information including the inhibitor concentration with the ammonia concentration in the contents of the reformer 2, the tank information including the inhibitor concentration in the contents of the readily degradable material tank 16, a first detected value 37 (different from the first detected value 32 described above) detected in the past in the biogas fermenter 4, including the inhibitor concentration in the contents of the biogas fermenter 4, the ammonia concentration, and the alkalinity, the reformed material information 34, and the state information 36, so that the tendency of insufficiency of nitrogen components is machine-learned in advance. By inputting the state of the reformer 2 (inhibitor concentration), the state of the readily degradable material tank 16 (inhibitor concentration), or the state of the biogas fermenter 4 (inhibitor concentration, ammonia concentration, and alkalinity) into the supply model M, the adjustment device 8 estimates that nitrogen components contained in the readily degradable material Y2 in the biogas fermenter 4 are insufficient, and increases the amount of additives containing nitrogen components supplied to the biogas fermenter 4, or increases the amount of water dehydrated from sludge containing nitrogen components circulated to the biogas fermenter 4. The reformer information may include, in addition to the concentration of ammonia in the reformed material Y1 in the reformer 2, the concentration of melanoidin, phenol, or fural. The reformer information may include, in addition to or instead of the concentration of ammonia, at least one of the concentration of volatile fatty acids, the concentration of an inhibitor, or the pH of the liquid component of the readily degradable material Y2. The tank information may include, in addition to or instead of the concentration of an inhibitor, at least one of the concentration of volatile fatty acids, the concentration of ammonia, or the pH of the liquid component of the readily degradable material Y2. The first detected value 37 may include at least one of the concentration of volatile fatty acids contained in the reformed material Y1 in the biogas fermenter 4, the concentration of an inhibitor, the concentration of ammonia, or the pH of the liquid component of the readily degradable material Y2.

FIGS. 7 to 10 are each a schematic configuration diagram of the waste treatment system 1 according to an embodiment of the present disclosure.

Figure 7:
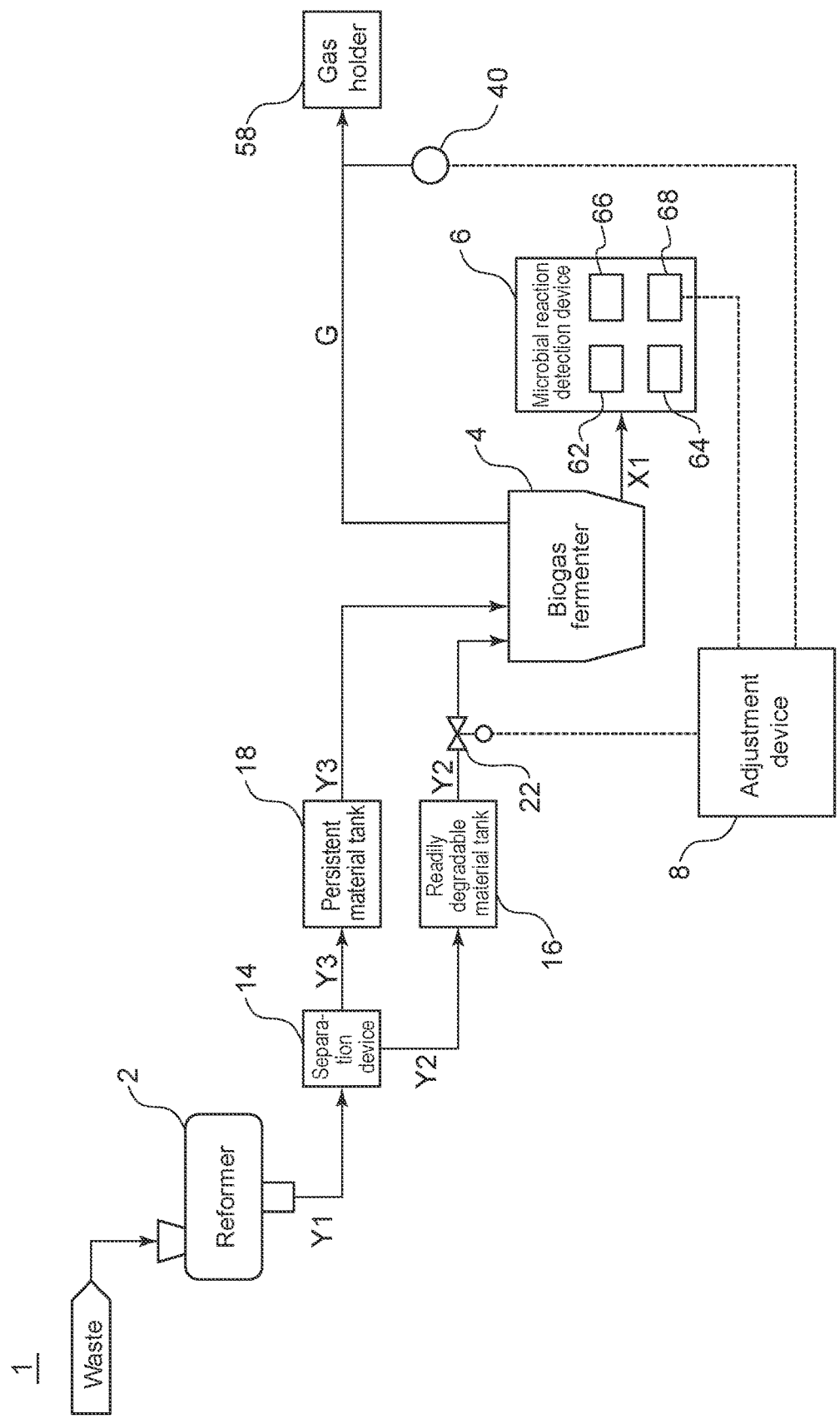
FIG. 7 is a schematic configuration diagram of the waste treatment system according to an embodiment of the present disclosure.

In an embodiment, as shown in FIG. 7, the waste treatment system 1 further includes a flow meter 40 for acquiring the amount of biogas G flowing from the biogas fermenter 4 to the gas holder 58. The adjustment device 8 is electrically connected to the flow meter 40 and acquires the amount of biogas G. Further, the adjustment device 8 adjusts the amount and timing of supply of the readily degradable material Y2 to the biogas fermenter 4, based on the state of the biogas fermenter 4 detected by the microbial reaction detection device 6 and the amount of biogas G acquired by the flow meter 40.

An example of the adjustment of the readily degradable material Y2 by the adjustment device 8 will now be described. The adjustment device 8 decreases the amount of the readily degradable material Y2 supplied to the biogas fermenter 4 when the concentration of volatile fatty acids (VFA) is within a predetermined set range (e.g., 1,000 ppm to 10,000 ppm) but the amount of biogas G is less than a predetermined set value.

With the configuration illustrated in FIG. 7, the adjustment device 8 adjusts the amount and timing of supply of the readily degradable material Y2 to the biogas fermenter 4, based on the state of the biogas fermenter 4 detected by the microbial reaction detection device 6 and the amount of biogas G acquired by the flow meter 40. Thus, the biogas fermenter 4 can be more quickly put in a state suitable for microbial degradation.

Figure 8:
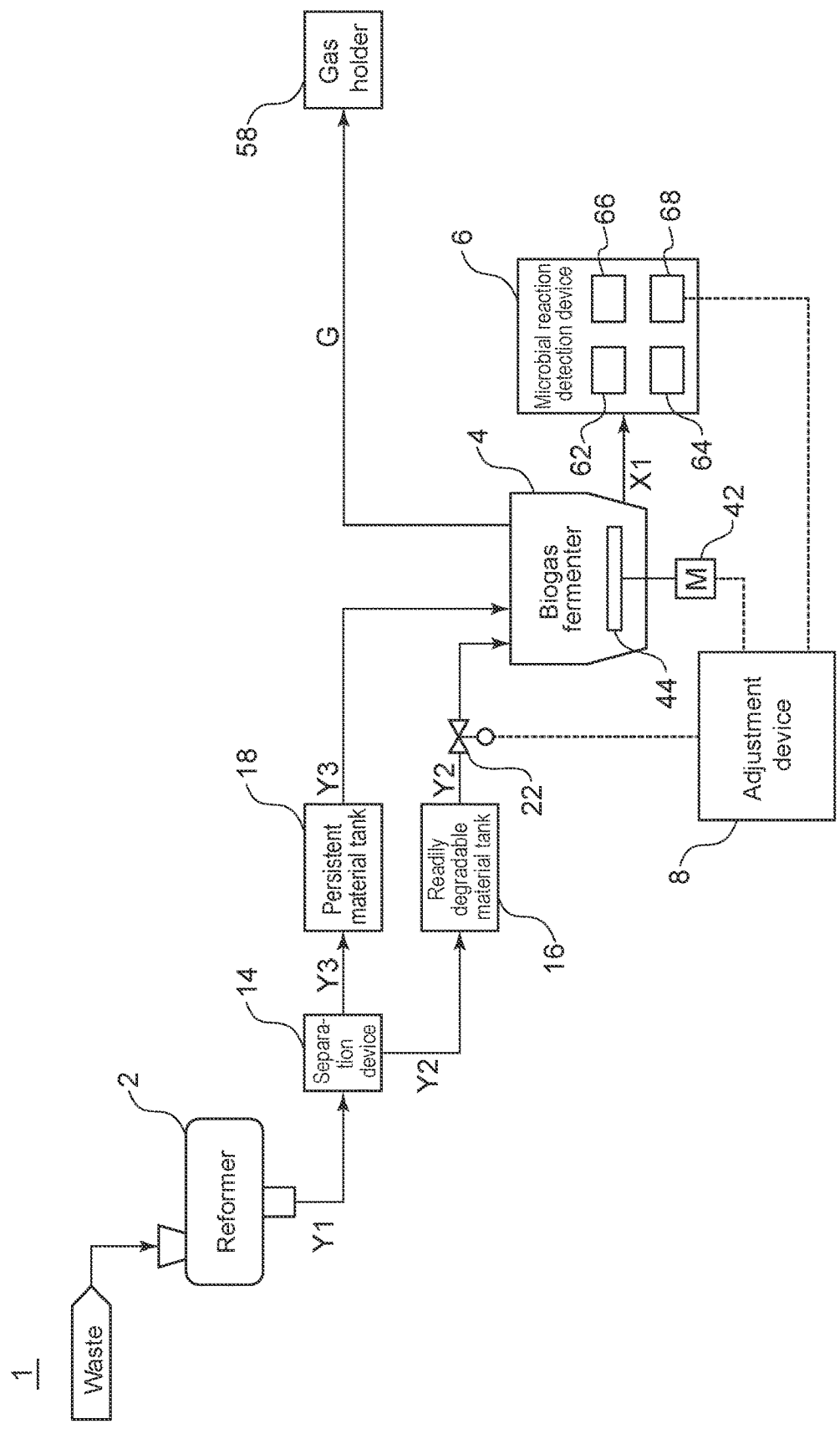
FIG. 8 is a schematic configuration diagram of the waste treatment system according to an embodiment of the present disclosure.

As shown in FIG. 8, the biogas fermenter 4 may be provided with an agitator 44 driven by a motor 42 for stirring the contents of the biogas fermenter 4. In the embodiment illustrated in FIG. 8, the adjustment device 8 is electrically connected to the motor 42 and acquires the torque of the motor 42. Further, the adjustment device 8 adjusts the amount and timing of supply of the readily degradable material Y2 to the biogas fermenter 4, based on the state of the biogas fermenter 4 detected by the microbial reaction detection device 6 and the torque of the motor 42.

An example of the adjustment of the readily degradable material Y2 by the adjustment device 8 will now be described. The adjustment device 8 decreases the amount of the readily degradable material Y2 supplied to the biogas fermenter 4 when the concentration of volatile fatty acids (VFA) exceeds a predetermined upper limit value (e.g., 10,000 ppm) and the torque of the motor 42 is less than a predetermined set torque. Further, the adjustment device 8 increases the amount of the readily degradable material Y2 supplied to the biogas fermenter 4 when the concentration of volatile fatty acids falls below a predetermined lower limit value (e.g., 1,000 ppm) and the torque of the motor 42 is more than a predetermined set torque.

With the configuration illustrated in FIG. 8, the adjustment device 8 adjusts the amount and timing of supply of the readily degradable material Y2 to the biogas fermenter 4, based on the state of the biogas fermenter 4 detected by the microbial reaction detection device 6 and the torque of the motor 42. Thus, the biogas fermenter 4 can be more quickly put in a state suitable for microbial degradation.

Figure 9:
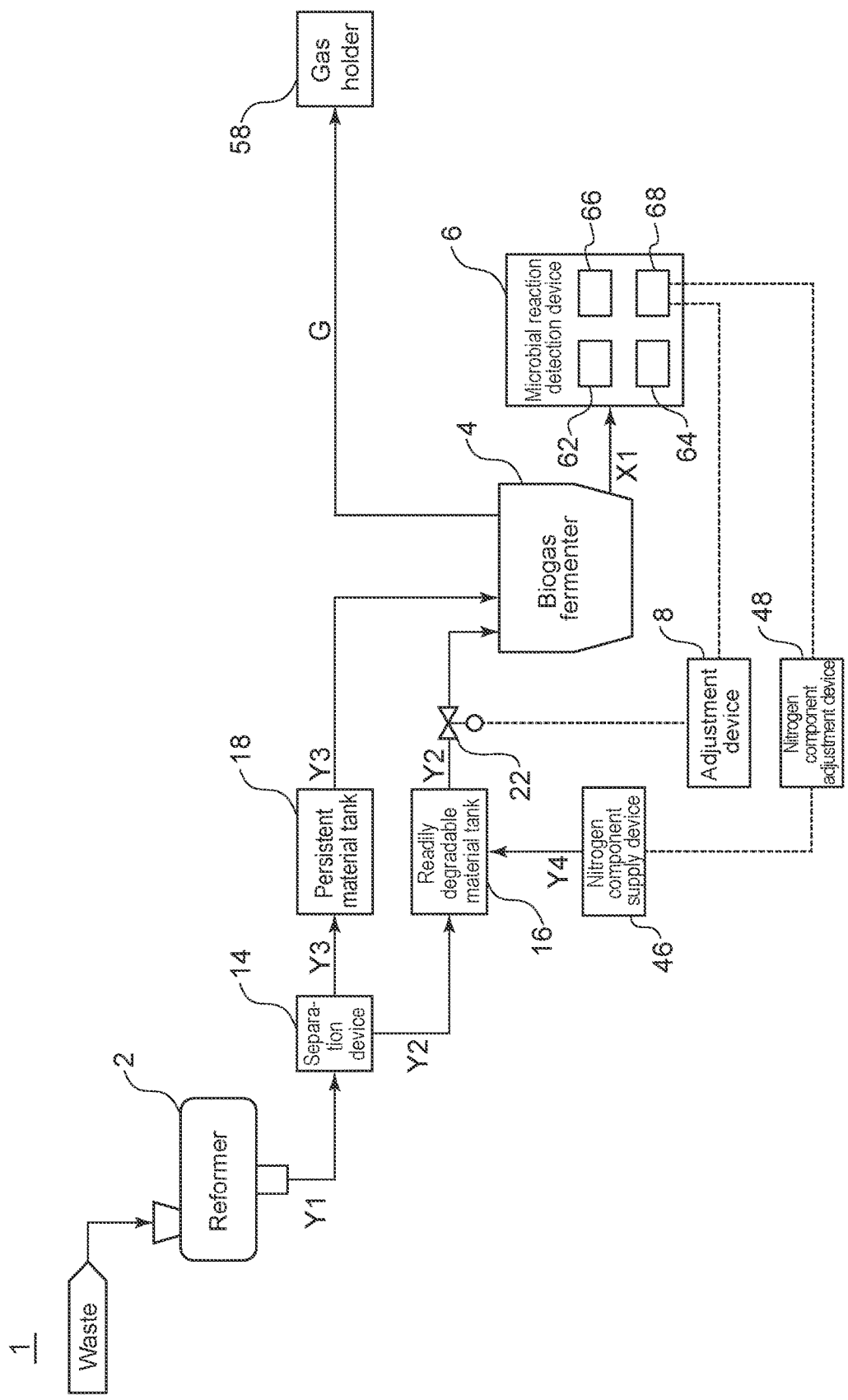
FIG. 9 is a schematic configuration diagram of the waste treatment system according to an embodiment of the present disclosure.

As shown in FIG. 9, in an embodiment, the waste treatment system 1 includes a nitrogen component supply device 46 for supplying a nitrogen-containing liquid Y4 containing nitrogen components such as ammonia water to the readily degradable material tank 16, and a nitrogen component adjustment device 48 for adjusting the amount of the nitrogen-containing liquid Y4 supplied from the nitrogen component supply device 46 to the readily degradable material tank 16, based on the concentration of ammonia measured by the concentration measurement device 68 of the microbial reaction detection device 6.

In the case where the waste is municipal waste, the readily degradable material Y2 stored in the readily degradable material tank 16 may contain a large amount of carbon components and a small amount of nitrogen components. Even if such a readily degradable material Y2 is supplied to the biogas fermenter 4, the microbial degradation (methane fermentation) may not be promoted. With the configuration illustrated in FIG. 9, since the nitrogen-containing liquid Y4 is supplied to the readily degradable material tank 16 based on the concentration of ammonia measured by the concentration measurement device 68, the biogas fermenter 4 can be put in a state suitable for microbial degradation more quickly. The adjustment device 8 may function as the nitrogen component adjustment device 48, or the adjustment device 8 and the nitrogen component adjustment device 48 may be physically separated from each other.

Figure 10:
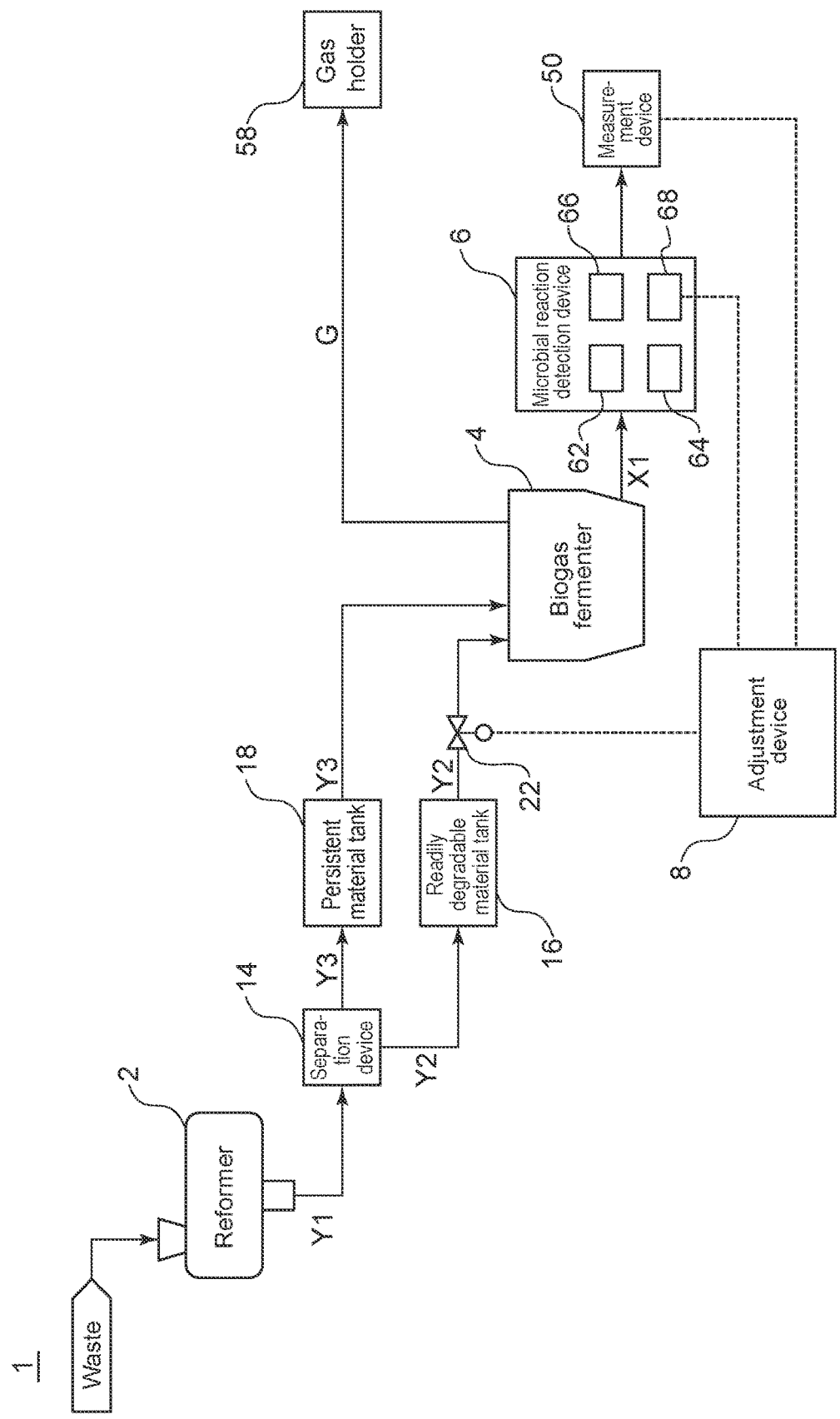
FIG. 10 is a schematic configuration diagram of the waste treatment system according to an embodiment of the present disclosure.

As shown in FIG. 10, in an embodiment, the waste treatment system 1 includes a measurement device 50 for measuring the electrical conductivity of the liquid component of the contents of the biogas fermenter 4. The adjustment device 8 adjusts the amount and timing of supply of the readily degradable material Y2 to the biogas fermenter 4, based on the state of the biogas fermenter 4 detected by the microbial reaction detection device 6 and a measured value of the measurement device 50. In the embodiment illustrated in FIG. 10, the measurement device 50 is configured to measure the electrical conductivity from the detection sample X1 after passing through the microbial reaction detection device 6 (i.e., the diluted liquid whose concentration has been measured by the concentration measurement device 68).

As shown in FIGS. 2 and 3, in the present disclosure, as examples of the detector of the waste treatment system 1 excluding the microbial reaction detection device 6, there has been mentioned the reforming state detection device 10 for detecting the state of the reformer 2, and the readily degradable material state detection device 26 for detecting the state of the readily degradable material tank 16. However, the waste treatment system 1 may include a detector other than the reforming state detection device 10 and the readily degradable material state detection device 26. Examples of the detector include devices for detecting raw material images (including hyperspectral images), agitation motor torque of the reformer 2, weight of the persistent material and weight of the readily degradable material Y2 separated by the separation device 14, motor torque of the readily degradable material tank 16, agitation motor torque of the biogas fermenter 4, amount of biogas produced in the biogas fermenter, and biogas properties (methane concentration, carbon dioxide concentration, moisture concentration, etc.).

On the other hand, as shown in FIGS. 2 and 3, in the present disclosure, as examples of the final control element of the waste treatment system 1 excluding the regulating valve 53 and the readily degradable material regulating valve 22, there has been mentioned the reformer 2 that can adjust the hydrolysis condition, and the cellulase supply device 28 for supplying cellulase to the readily degradable material tank 16. However, the waste treatment system 1 may include a final control element other than the reformer 2 and the cellulase supply device 28. Examples of the final control element include devices for adjusting the separation sieve conditions (mesh size, feeding speed, amplitude, moisture adjustment, etc.) of the separation device 14 and the amount of additives supplied to the biogas fermenter 4.

By providing multiple detectors and final control elements, the adjustment device 8 can determine and take countermeasures against poor methanogen activity, generation of inhibitors, increase in persistent materials, increase in readily degradable materials, decrease in nitrogen in the raw material, increase in moisture in the raw material, increase in plastic content, and so on.

Figure 11:
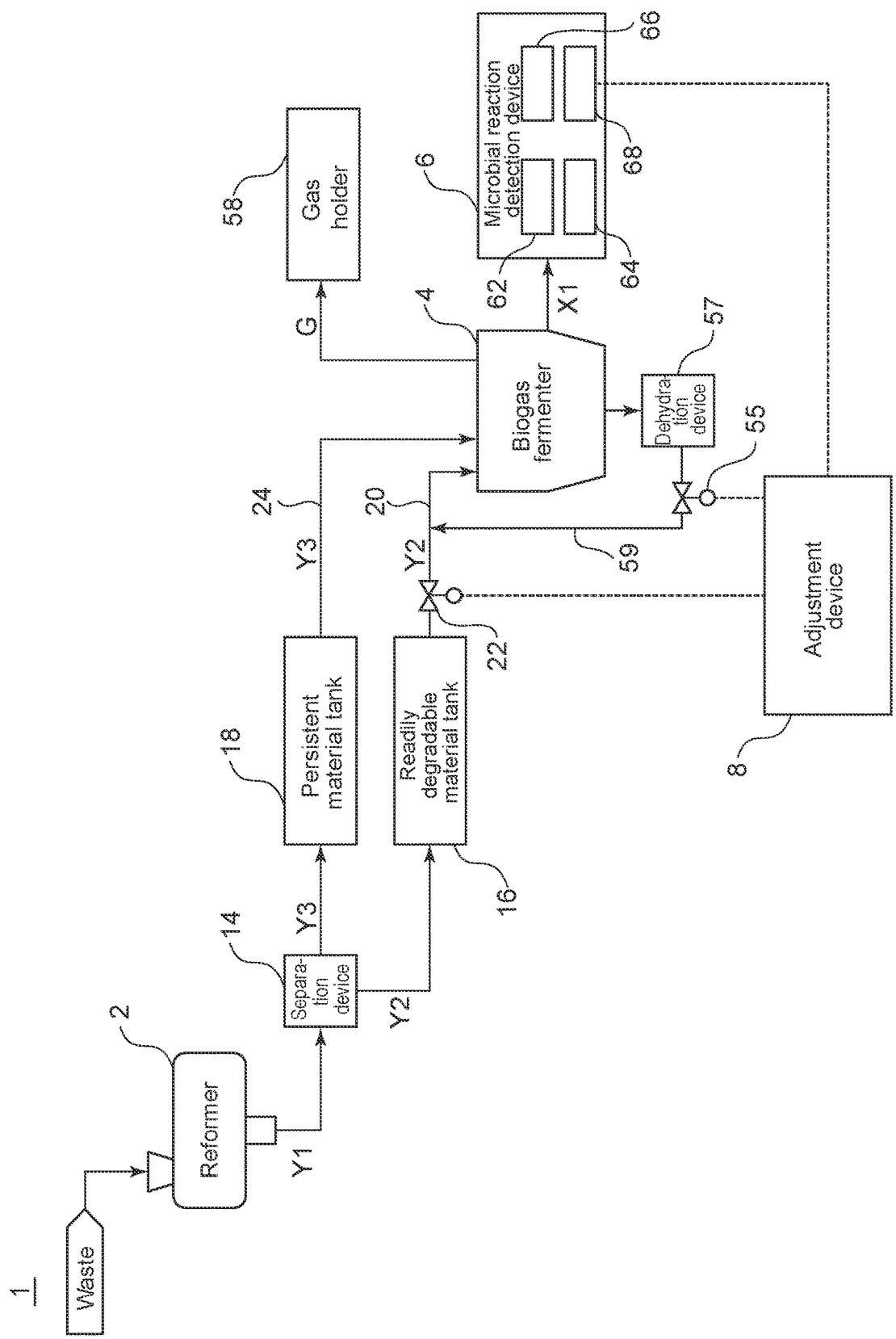
FIG. 11 is a schematic configuration diagram of the waste treatment system according to an embodiment of the present disclosure.

As shown in FIG. 11, in an embodiment, the waste treatment system 1 further includes a concentration adjustment device 55. In the embodiment illustrated in FIG. 11, the waste treatment system 1 includes a dehydration device 57 for dehydrating a fermentation residue of the biogas fermenter 4. The dehydration device 57 communicates with the readily degradable material line 20 via a water injection pipe 59. The water injection pipe 59 is provided with a concentration adjustment device 55 (regulating valve) for supplying water dehydrated from the fermentation residue to the readily degradable material line 20. The concentration adjustment device 55 is electrically connected to the adjustment device 8, and the opening degree thereof is adjusted according to instructions from the adjustment device 8. Such a concentration adjustment device 55 adjusts the concentration of ammonia contained in the readily degradable material Y2, based on the concentration of ammonia contained in the diluted liquid measured by the concentration measurement device 68.

With the configuration illustrated in FIG. 11, by adjusting the concentration of ammonia contained in the contents of the biogas fermenter 4, the biogas fermenter 4 can be maintained in a state suitable for microbial degradation. In order to increase the fluidity of the readily degradable material Y2, water may be added to the readily degradable material Y2 to increase the moisture content. On the other hand, since water dehydrated from the fermentation residue contains ammonia, if the contents of the biogas fermenter have low nitrogen content, a nitrogen-containing substance can also be replenished. Although not shown, in another embodiment, the waste treatment system 1 may include a nitrogen component addition device for adding additives containing nitrogen components to the readily degradable material Y2, and the concentration adjustment device 55 may adjust the amount of additives added to the readily degradable material Y2 by the nitrogen component addition device.

Figure 12:
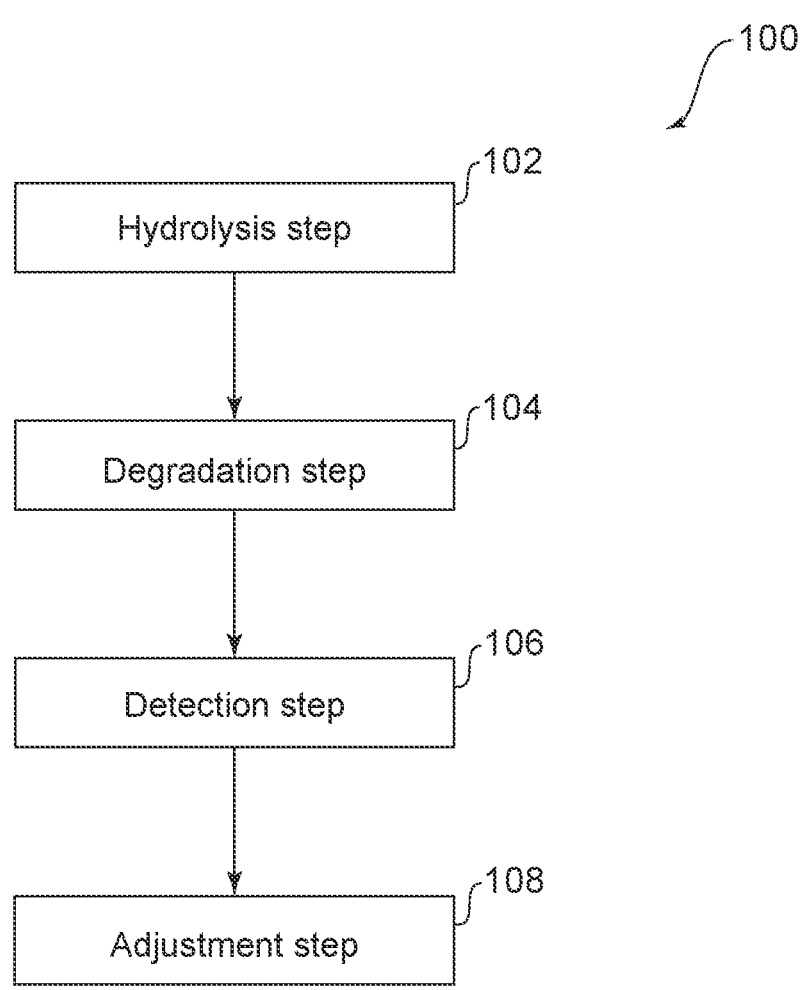
FIG. 12 is a flowchart of the waste treatment method according to an embodiment of the present disclosure.

FIG. 12 is a flowchart of the waste treatment method according to an embodiment of the present disclosure. As shown in FIG. 12, the waste treatment method 100 includes a step 102 of hydrolyzing waste, a step 104 of microbially degrading a reformed material Y1 containing at least a solid of the hydrolyzed waste, a step 106 of detecting the state of degradation of the reformed material Y1 in the biogas fermenter 4 (the state of the biogas fermenter 4), and a step 108 of adjusting the amount of the reformed material Y1 in the step 104 of microbially degrading the reformed material Y1, based on the detected state of degradation of the reformed material Y1. With this method, it is possible to maintain the biogas fermenter 4 in a state suitable for microbial degradation.

The contents described in the above embodiments would be understood as follows, for instance.

[1] A waste treatment system (1) according to the present disclosure includes: at least one reformer (2) for hydrolyzing waste; a microbial reactor (4) for microbially degrading a reformed material containing at least a solid of the waste hydrolyzed by the at least one reformer; a microbial reaction detection device (6) for detecting a state of degradation of the reformed material in the microbial reactor; and an adjustment device (8) for adjusting amount and timing of supply of the reformed material to the microbial reactor, based on a detected value of the microbial reaction detection device.

With the above configuration [1], since the amount and timing of supply of the reformed material to the microbial reactor are adjusted based on the state of degradation of the reformed material in the microbial reactor detected by the microbial reaction detection device, the microbial reactor can be maintained in a state suitable for microbial degradation.

[2] In some embodiments, in the above configuration [1], the microbial reaction detection device includes: a collecting device (62) for collecting part of the reformed material in the microbial reactor as a detection sample; a solid-liquid separation device (64) for separating the detection sample into a solid component and a liquid component; a dilution device (66) for diluting the liquid component separated by the solid-liquid separation device; and a concentration measurement device (68) for measuring concentration of a diluted liquid which is the liquid component diluted by the dilution device.

The state of degradation of the reformed material in the microbial reactor (hereinafter, the state of the microbial reactor) may be determined based on the concentration of the liquid component of the reformed material in the microbial reactor. With the above configuration [2], since the microbial reaction detection device includes the collecting device, the solid-liquid separation device, the dilution device, and the concentration measurement device, the state of degradation of the reformed material in the microbial reactor can be detected.

[3] In some embodiments, in the above configuration [2], a measured value of the concentration measurement device includes at least one of concentration of volatile fatty acids or concentration of ammonia contained in the diluted liquid.

The state of the microbial reactor may be determined based on at least one of the concentration of volatile fatty acids or the concentration of ammonia in the liquid component of the contents of the microbial reactor. With the above configuration [3], since the concentration measurement device of the microbial reaction detection device measures at least one of the concentration of volatile fatty acids or the concentration of ammonia contained in the diluted liquid, the microbial reaction detection device can detect the state of the microbial reactor. If methane bacteria activity is determined to be poor, freeze-dried fungi may be fed into the methane fermenter.

[4] In some embodiments, in any one of the above configurations [1] to [3], the waste treatment system further includes: a reforming state detection device (10) for detecting a state of hydrolysis of the waste in the reformer; and a hydrolysis condition adjustment device (12) for adjusting a hydrolysis condition of the waste by the reformer, based on the state of hydrolysis of the waste in the reformer detected by the reforming state detection device.

With the above configuration [4], since the waste treatment system adjusts the hydrolysis condition of waste in the reformer based on the state of hydrolysis of the waste in the reformer, the reformed material suitable for microbial reaction can be supplied to the microbial reactor to efficiently produce valuables by microbial reaction.

[5] In some embodiments, in any one of the above configurations [1] to [4], the reformed material supplied to the microbial reactor includes a readily degradable material that can be microbially degraded within a predetermined time in the microbial reactor. The adjustment device is configured to adjust supply amount of the readily degradable material supplied to the microbial reactor and timing of supply of the readily degradable material to the microbial reactor, based on a detected value of the microbial reaction detection device.

Whether it is suitable for microbial degradation often depends on the amount and timing of supply of the readily degradable material to the microbial reactor. With the above configuration [5], since the adjustment device adjusts the supply amount of the readily degradable material to the microbial reactor and the timing of supply of the readily degradable material to the microbial reactor, the microbial reactor can be maintained in a state suitable for microbial degradation.

[6] In some embodiments, in any one of the above configurations [1] to [5], the waste treatment system further includes a separation device (14), disposed between the at least one reformer and the microbial reactor, for separating a reaction-unsuitable substance that is unsuitable for microbial degradation in the microbial reactor from the reformed material.

With the above configuration [6], since the waste treatment system includes the separation device, it is possible to separate the reaction-unsuitable substance from the reformed material and reduce the amount of the reaction-unsuitable substance supplied to the microbial reactor. As a result, it is possible to reduce the risk of inhibiting the degradation in the microbial reactor, and to efficiently perform the degradation.

[7] In some embodiments, in the above configuration [6], the reformed material supplied to the microbial reactor includes a readily degradable material that can be microbially degraded within a predetermined time in the microbial reactor, and a persistent material that takes a longer time to be microbially degraded than the readily degradable material. The separation device is configured to separate the reformed material into the readily degradable material and the persistent material.

With the above configuration [7], it is possible to reduce the amount of the persistent material supplied to the microbial reactor. As a result, it is possible to reduce the risk of inhibiting the degradation in the microbial reactor, and to efficiently perform the degradation. In addition, by supplying the readily degradable material with high purity and fluidity to the microbial reactor, it is possible to quickly put the microbial reactor in a state suitable for microbial degradation.

[8] In some embodiments, in any one of the above configurations [1] to [7], the reformed material supplied to the microbial reactor includes a readily degradable material that can be microbially degraded within a predetermined time in the microbial reactor. The waste treatment system further includes: a readily degradable material tank (16) for storing the readily degradable material; and a readily degradable material state detection device (26) for detecting a state of the readily degradable material in the readily degradable material tank.

With the above configuration [8], the state of the readily degradable material in the readily degradable material tank can be grasped.

[9] In some embodiments, in the above configuration [8], the readily degradable material state detection device is configured to detect at least one of turbidity or sugar content of the readily degradable material in the readily degradable material tank. The waste treatment system further includes a cellulase supply device (28) for supplying cellulase to the readily degradable material tank, based on the at least one of turbidity or sugar content of the readily degradable material in the readily degradable material tank detected by the readily degradable material state detection device.

The turbidity and sugar content of the readily degradable material in the readily degradable material tank depend on the content of cellulose in the readily degradable material. Hydrolysis of waste containing more waste paper and plant may yield the readily degradable material containing more cellulose. With the above configuration [9], since cellulase is supplied to the readily degradable material tank based on at least one of the turbidity or sugar content of the readily degradable material in the readily degradable material tank, the microbial degradation of cellulose in the microbial reactor can be promoted.

[10] In some embodiments, in any one of the above configurations [1] to [9], the adjustment device includes a storage unit (30) that stores a supply model created based on a first detected value detected in past by the microbial reaction detection device, reformed material information including the amount and timing of supply of the reformed material to the microbial reactor based on the first detected value, and state information including the state of degradation of the reformed material in the microbial reactor. The adjustment device is configured to calculate the amount and timing of supply of the reformed material to the microbial reactor by inputting a second detected value detected by the microbial reaction detection device into the supply model.

With the above configuration [10], since the amount and timing of supply of the reformed material to the microbial reactor are calculated by the supply model creased based on the first detected value, the reformed material information, and the state information, the microbial reactor can be maintained in a state suitable for microbial degradation.

[11] In some embodiments, in the above configuration [10], the supply model is created by machine-learning teacher data in which the first detected value, the reformed material information, and the state information are associated with each other.

With the above configuration [11], it is possible to improve the accuracy of the supply model.

[12] In some embodiments, in the above configuration or [11], the reformed material supplied to the microbial reactor includes a readily degradable material that can be microbially degraded within a predetermined time in the microbial reactor. The waste treatment system further includes at least one tank, disposed between the at least one reformer and the microbial reactor, for storing the reformed material. The supply mode is created based on: reformer information including at least one of torque for stirring contents of the reformer or amount of the readily degradable material contained in the reformer; tank information including at least one of concentration of volatile fatty acids, concentration of an inhibitor, concentration of ammonia contained in contents of the at least one tank, or pH of the contents of the at least one tank; the first detected value detected in past by the microbial reaction detection device, the first detected value including at least one of concentration of volatile fatty acids, concentration of an inhibitor, concentration of ammonia contained in contents of the microbial reactor, pH of the contents of the microbial reactor, or torque for stirring the contents of the microbial reactor; the reformed material information; and the state information. The adjustment device is configured to calculate the amount and timing of supply of the reformed material to the microbial reactor by inputting the first detected value, the reformer information, and the tank information into the supply model.

With the above configuration [12], by inputting the first detected value, the reformer information, and the tank information as explanatory variables, the adjustment device can calculate the amount and timing of supply of the reformed material to the microbial reactor as objective variables.

[13] In some embodiments, in the above configuration or [11], the waste treatment system further includes at least one tank, disposed between the at least one reformer and the microbial reactor, for storing the reformed material. The supply mode is created based on: reformer information including at least one of concentration of volatile fatty acids, concentration of an inhibitor, concentration of ammonia contained in contents of the reformer, or pH of the contents of the reformer; tank information including at least one of concentration of volatile fatty acids, concentration of an inhibitor, concentration of ammonia contained in contents of the at least one tank, or pH of the contents of the at least one tank; the first detected value detected in past by the microbial reaction detection device, the first detected value including at least one of concentration of volatile fatty acids, concentration of an inhibitor, concentration of ammonia contained in contents of the microbial reactor, or pH of the contents of the microbial reactor; the reformed material information; and the state information. The adjustment device is configured to adjust amount of nitrogen supplied to the microbial reactor by inputting the first detected value, the reformer information, and the tank information into the supply model.

With the above configuration [13], by inputting the first detected value, the reformer information, and the tank information as explanatory variables, the adjustment device can calculate the amount of nitrogen supplied to the microbial reactor as an objective variable.

[14] In some embodiments, in any one of the above configurations [1] to [13], the waste treatment system further includes a plurality of tanks, disposed between the at least one reformer and the microbial reactor, for storing the reformed material. The plurality of tanks are arranged in parallel to each other.

With the above configuration [14], by storing the reformed material in any of the tanks, the adjustment device can adjust the amount and timing of supply of the reformed material from any of the tanks to the microbial reactor.

[15] In some embodiments, in the above configuration [14], the reformed material supplied to the microbial reactor includes a readily degradable material that can be microbially degraded within a predetermined time in the microbial reactor, and a persistent material that takes a longer time to be microbially degraded than the readily degradable material. The plurality of tanks includes: a readily degradable material tank for storing the readily degradable material; a persistent material tank for storing the persistent material; and an inhibitor avoidance tank for storing an inhibitor contained in the reformed material.

With the above configuration [15], the amount of the readily degradable material supplied to the microbial reactor can be adjusted, while the amount of the persistent material and the amount of the inhibitor supplied to the microbial reactor can be reduced. As a result, it is possible to reduce the risk of inhibiting the degradation in the microbial reactor, and to efficiently perform the degradation.

[16] In some embodiments, in any one of the above configurations [1] to [15], the microbial reaction detection device includes: a collecting device for collecting part of the reformed material in the microbial reactor as a detection sample; a solid-liquid separation device for separating the detection sample into a solid component and a liquid component; a dilution device for diluting the liquid component separated by the solid-liquid separation device; and a concentration measurement device for measuring concentration of a diluted liquid which is the liquid component diluted by the dilution device. A measured value of the concentration measurement device includes concentration of ammonia contained in the diluted liquid. The waste treatment system further includes a concentration adjustment device for adjusting concentration of ammonia contained in the reformed material, based on the concentration of ammonia contained in the diluted liquid measured by the concentration measurement device.

With the above configuration [16], it is possible to adjust the concentration of ammonia in the contents of the microbial reactor.

[17] A waste treatment method (100) according to the present disclosure includes: a step (102) of hydrolyzing waste; a step (104) of microbially degrading a reformed material containing at least a solid of the hydrolyzed waste; a step (106) of detecting a state of degradation of the reformed material; and a step (108) of adjusting amount of the reformed material in the step of microbially degrading the reformed material, based on the detected state of degradation of the reformed material.

With the above method [17], it is possible to maintain the microbial reactor in a state suitable for microbial degradation.

REFERENCE SIGNS LIST

1 Waste treatment system
2 Reformer
4 Biogas fermenter (Microbial reactor)
6 Microbial reaction detection device
8 Adjustment device
10 Reforming state detection device
12 Hydrolysis condition adjustment device
14 Separation device
16 Readily degradable material tank
18 Persistent material tank
26 Readily degradable material state detection device
28 Cellulase supply device
Storage unit
62 Collecting device
64 Solid-liquid separation device
66 Dilution device
68 Concentration measurement device
100 Waste treatment method

The invention claimed is:

1. A waste treatment system, comprising:
at least one reformer for hydrolyzing waste;
a microbial reactor for microbially degrading a reformed material containing at least a solid of the waste hydrolyzed by the at least one reformer;
a microbial reaction detection device for detecting a state of degradation of the reformed material in the microbial reactor; and
an adjustment device for adjusting amount and timing of supply of the reformed material to the microbial reactor, based on a detected value of the microbial reaction detection device,
wherein the adjustment device includes a storage unit that stores a supply model created based on a first detected value detected in past by the microbial reaction detection device, reformed material information including the amount and timing of supply of the reformed material to the microbial reactor based on the first detected value, and state information including the state of degradation of the reformed material in the microbial reactor, and
wherein the adjustment device is configured to calculate the amount and timing of supply of the reformed material to the microbial reactor by inputting a second detected value detected by the microbial reaction detection device into the supply model.

2. The waste treatment system according to claim 1,
wherein the microbial reaction detection device includes:
a collecting device for collecting part of the reformed material in the microbial reactor as a detection sample;
a solid-liquid separation device for separating the detection sample into a solid component and a liquid component;
a dilution device for diluting the liquid component separated by the solid-liquid separation device; and
a concentration measurement device for measuring concentration of a diluted liquid which is the liquid component diluted by the dilution device.

3. The waste treatment system according to claim 2,
wherein a measured value of the concentration measurement device includes at least one of concentration of volatile fatty acids or concentration of ammonia contained in the diluted liquid.

4. The waste treatment system according to claim 1, further comprising:
a reforming state detection device for detecting a state of hydrolysis of the waste in the reformer; and
a hydrolysis condition adjustment device for adjusting a hydrolysis condition of the waste by the reformer, based on the state of hydrolysis of the waste in the reformer detected by the reforming state detection device.

5. The waste treatment system according to claim 1,
wherein the reformed material supplied to the microbial reactor includes a readily degradable material that can be microbially degraded within a predetermined time in the microbial reactor, and
wherein the adjustment device is configured to adjust supply amount of the readily degradable material supplied to the microbial reactor and timing of supply of the readily degradable material to the microbial reactor, based on a detected value of the microbial reaction detection device.

6. The waste treatment system according to claim 1, further comprising a separation device, disposed between the at least one reformer and the microbial reactor, for separating a reaction-unsuitable substance that is unsuitable for microbial degradation in the microbial reactor from the reformed material.

7. The waste treatment system according to claim 6, wherein the reformed material supplied to the microbial reactor includes a readily degradable material that can be microbially degraded within a predetermined time in the microbial reactor, and a persistent material that takes a longer time to be microbially degraded than the readily degradable material, and
wherein the separation device is configured to separate the reformed material into the readily degradable material and the persistent material.

8. The waste treatment system according to claim 1, wherein the reformed material supplied to the microbial reactor includes a readily degradable material that can be microbially degraded within a predetermined time in the microbial reactor, and
wherein the waste treatment system further comprises:
a readily degradable material tank for storing the readily degradable material; and
a readily degradable material state detection device for detecting a state of the readily degradable material in the readily degradable material tank.

9. The waste treatment system according to claim 8, wherein the readily degradable material state detection device is configured to detect at least one of turbidity or sugar content of the readily degradable material in the readily degradable material tank, and
wherein the waste treatment system further comprises a cellulase supply device for supplying cellulase to the readily degradable material tank, based on the at least one of turbidity or sugar content of the readily degradable material in the readily degradable material tank detected by the readily degradable material state detection device.

10. The waste treatment system according to claim 1, wherein the supply model is created by machine-learning teacher data in which the first detected value, the reformed material information, and the state information are associated with each other.

11. The waste treatment system according to claim 1, wherein the reformed material supplied to the microbial reactor includes a readily degradable material that can be microbially degraded within a predetermined time in the microbial reactor,
wherein the waste treatment system further comprises at least one tank, disposed between the at least one reformer and the microbial reactor, for storing the reformed material,
wherein the supply model is created based on:
reformer information including at least one of torque for stirring contents of the reformer or amount of the readily degradable material contained in the reformer;
tank information including at least one of concentration of volatile fatty acids, concentration of an inhibitor, concentration of ammonia contained in contents of the at least one tank, or pH of the contents of the at least one tank;
the first detected value detected in past by the microbial reaction detection device, the first detected value including at least one of concentration of volatile fatty acids, concentration of an inhibitor, concentration of ammonia contained in contents of the microbial reactor, pH of the contents of the microbial reactor, or torque for stirring the contents of the microbial reactor;
the reformed material information; and
the state information, and
wherein the adjustment device is configured to calculate the amount and timing of supply of the reformed material to the microbial reactor by inputting the first detected value, the reformer information, and the tank information into the supply model.

12. The waste treatment system according to claim 1, further comprising at least one tank, disposed between the at least one reformer and the microbial reactor, for storing the reformed material,
wherein the supply model is created based on:
reformer information including at least one of concentration of volatile fatty acids, concentration of an inhibitor, concentration of ammonia contained in contents of the reformer, or pH of the contents of the reformer;
tank information including at least one of concentration of volatile fatty acids, concentration of an inhibitor, concentration of ammonia contained in contents of the at least one tank, or pH of the contents of the at least one tank;
the first detected value detected in past by the microbial reaction detection device, the first detected value including at least one of concentration of volatile fatty acids, concentration of an inhibitor, concentration of ammonia contained in contents of the microbial reactor, or pH of the contents of the microbial reactor;
the reformed material information; and
the state information, and
wherein the adjustment device is configured to adjust amount of nitrogen supplied to the microbial reactor by inputting the first detected value, the reformer information, and the tank information into the supply model.

13. The waste treatment system according to claim 1, further comprising a plurality of tanks, disposed between the at least one reformer and the microbial reactor, for storing the reformed material,
wherein the plurality of tanks are arranged in parallel to each other.

14. The waste treatment system according to claim 13, wherein the reformed material supplied to the microbial reactor includes a readily degradable material that can be microbially degraded within a predetermined time in the microbial reactor, and a persistent material that takes a longer time to be microbially degraded than the readily degradable material, and
wherein the plurality of tanks includes:
a readily degradable material tank for storing the readily degradable material;
a persistent material tank for storing the persistent material; and
an inhibitor avoidance tank for storing an inhibitor contained in the reformed material.

15. The waste treatment system according to claim 1,
wherein the microbial reaction detection device includes:
- a collecting device for collecting part of the reformed material in the microbial reactor as a detection sample;
- a solid-liquid separation device for separating the detection sample into a solid component and a liquid component;
- a dilution device for diluting the liquid component separated by the solid-liquid separation device; and
- a concentration measurement device for measuring concentration of a diluted liquid which is the liquid component diluted by the dilution device, wherein a measured value of the concentration measurement device includes concentration of ammonia contained in the diluted liquid, and wherein the waste treatment system further comprises a concentration adjustment device for adjusting concentration of ammonia contained in the reformed material, based on the concentration of ammonia contained in the diluted liquid measured by the concentration measurement device.

16. The waste treatment system according to claim 1,
wherein the reformer is configured to hydrolyze the waste with steam in a batch manner.

* * * * *